United States Patent
Aruga

(10) Patent No.: US 6,621,542 B1
(45) Date of Patent: Sep. 16, 2003

(54) ELECTRO-OPTIC PANEL, DEVICE, AND APPARATUS HAVING A MARK ON A PLANARIZED LAYER ON AN IRREGULAR SURFACE

(75) Inventor: Yasuhito Aruga, Okaya (JP)

(73) Assignee: Seiko Epson Corporation (JP)

( * ) Notice: Subject to any disclaimer, the term of this patent is extended or adjusted under 35 U.S.C. 154(b) by 161 days.

(21) Appl. No.: 09/697,768

(22) Filed: Oct. 26, 2000

(30) Foreign Application Priority Data

Oct. 29, 1999 (JP) ............................................. 11-309145

(51) Int. Cl.[7] ............................................. G02F 1/1333
(52) U.S. Cl. ........................ 349/113; 349/122; 349/158; 349/187
(58) Field of Search ................................ 349/113, 114, 349/122, 138, 158, 187, 191

(56) References Cited

U.S. PATENT DOCUMENTS 4,519,678 A * 5/1985 Komatsubara et al. ...... 350/338
6,130,736 A * 10/2000 Sasaki et al. ................ 349/122
6,229,586 B1 * 5/2001 Date et al. ................... 349/113

FOREIGN PATENT DOCUMENTS

| JP | 10-133199 | 5/1998 |
| JP | 10-301143 | 11/1998 |

* cited by examiner

*Primary Examiner*—Toan Ton
*Assistant Examiner*—Andrew Schechter
(74) *Attorney, Agent, or Firm*—Harness, Dickey & Pierce, P.L.C.

(57) ABSTRACT

An electro-optic panel 100 has a first substrate 10 and a second substrate 20 opposing each other. The first substrate 10 has a protruding portion 12 formed so that an edge portion of the first substrate 10 protrudes toward the outside from an edge portion of the second substrate 20. The surface of the first substrate 10 opposing the second substrate 20 is formed to have an irregular surface 14. On the irregular surface 14 in the protruding portion 12 of the first substrate 10, a planarized layer is formed, and on the planarized layer 60, the mark (alignment mark 70) is formed. The electro-optic device includes the electro-optic panel 100. The electronic apparatus includes the electro-optic device.

38 Claims, 17 Drawing Sheets

ELECTRO-OPTIC PANEL, DEVICE, AND APPARATUS HAVING A MARK ON A PLANARIZED LAYER ON AN IRREGULAR SURFACE

BACKGROUND OF THE INVENTION

1. Field of the Invention

The present invention relates to electro-optic panels having marks, such as alignment marks and marks for process control, and to manufacturing methods therefor. In addition, the present invention relates to electro-optic devices comprising electro-optic panels. Furthermore, the present invention relates to electronic apparatuses comprising the electro-optic devices.

2. Description of the Related Art

Display devices have been widely used for mobile apparatuses and information display terminals at home, in offices and/or at worksites, in cars, and the like. In particular, liquid crystal display panels have features such as being thin and lightweight and using low voltage and having low power consumption. Recently, since the need for even lower power consumption has increased, the use of reflective liquid crystal display devices has increased. A reflective liquid crystal display device is a liquid crystal device provided with a reflective layer so as to utilize incident light thereon from the outside as a light source. The reflective liquid crystal device has a liquid crystal display panel.

Hereinafter, a liquid crystal display panel used for the reflective liquid crystal device will be described. FIG. 16 is a schematic plan view showing a liquid crystal display panel.

A liquid crystal display panel 600 has a first substrate 610 and a second substrate 620.

The first substrate 610 and the second substrate 620 oppose each other. At a predetermined side edge portion (lower side in FIG. 16) of the liquid crystal display panel 600, the first substrate 610 is disposed so that an edge portion thereof protrudes toward the outside from an edge portion of the second substrate 620. That is, the first substrate 610 has a portion (hereinafter referred to as a "protruding portion of the first substrate") 612 at which the first substrate 610 does not overlap the second substrate 620.

At a side edge portion (left side in FIG. 16) adjacent to the side edge portion of the liquid crystal display panel 600 described above, the second substrate 620 is disposed so that an edge portion thereof protrudes toward the outside from an edge portion of the first substrate 610. That is, the second substrate 620 has a portion (hereinafter referred to as a "protruding portion of the second substrate") 622 at which the second substrate 610 does not overlap the first substrate 610.

At predetermined locations on the first protruding portion 612 and the second protruding portion 622, alignment marks 670 are formed.

FIG. 17 is a schematic cross-sectional view of the part taken along the line B—B in FIG. 16.

At the periphery between the first substrate 610 and the second substrate 620, a sealing member 632 is formed. Since the sealing member 632 is formed, a predetermined gap (hereinafter referred to as a "cell gap") 630 is maintained between the first substrate 610 and the second substrate 620. In addition, in the cell gap 630, liquid crystal is enclosed, whereby a liquid crystal layer 634 is formed.

The surface of the first substrate 610 opposing the second substrate 620 is formed to have an irregular surface 614. The irregular surface 614 is so formed in order that light for display will be scattered so as to increase the viewing angle. In addition, on the irregular surface 614, a reflective layer 640 is formed. The shape of the upper surface of the reflective layer 640 conforms to the irregular surface thereunder. On the reflective layer 640, a layered structure [laminate] (not shown) composed of a transparent electrode, an alignment film, and the like is formed.

On the surface of the second substrate 620 opposite the first substrate 610, a retardation film 684 and a polarizer 686 are formed. On the surface of the second substrate 620 opposing the first substrate 610, a layered structure (not shown) composed of a transparent electrode, an alignment film, and the like is formed.

On the irregular surface 614 in the protruding portion 612 of the first substrate 610, the alignment marks 670 are formed. FIG. 18 is an enlarged schematic view of B in FIG. 17.

As shown in FIG. 18, when the alignment marks 670 are formed on the irregular surface 614, the upper surfaces 674 of the alignment marks 670 conforms to the shape of the irregular surface 614. In the case in which the first substrate 610 and a flexible circuit board (not shown) are aligned with each other, when the upper surfaces 674 of the alignment marks 670 are irregular, problems may occur.

The alignment mentioned above is performed by detecting light emitted from a light source (not shown) by, for example, a CCD camera (not shown). The light source and the CCD camera are disposed at locations opposing the alignment marks 670. In the case in which the upper surfaces 674 of the alignment masks 670 are irregular, when the alignment is performed, as shown in FIG. 18, the light is scattered at the upper surfaces 674 of the alignment marks 670, and hence, the image detected by the CCD camera is blurred. consequently, the alignment marks 670 are difficult to be visually detected using the CCD camera. As a result, alignment is difficult to perform when the alignment marks 670 are formed as described above.

An object of the present invention is to provide an electro-optic panel in which visual detection of a mark can be performed properly [optically] and to provide a manufacturing method therefor.

Another aspect of the present invention is to provide an electro-optic device and an electronic apparatus, which include the electro-optic panel.

SUMMARY OF THE INVENTION

An electro-optic panel of the present invention comprises, a first substrate and a second substrate opposing each other, in which the first substrate has a protruding portion formed so that an edge portion thereof protrudes toward the outside from an edge portion of the second substrate, and in which a surface of the first substrate opposing the second substrate has an irregular surface, a planarized layer provided on the irregular surface in the protruding portion; and a mark provided on the planarized layer.

In this context, the mark is an alignment mark or a mark for process control.

According to the electro-optic panel of the present invention, the visual [or optical] detection of the mark can e performed properly.

Hereinafter, the reasons for this will be described. In the electro-optic panel of the present invention, the mark is formed on the planarized layer. Accordingly, at the upper surface of the mark, light scattering can be reduced. As a result, the visual detection of the mark can be performed properly. Consequently, according to the electro-optic panel of the present invention, compared to the case of an electro-optic panel in which the mark is formed on an irregular surface, for example, the alignment of the electro-optic panel with a flexible circuit board can be performed with high precision.

In addition, in the electro-optic panel of the present invention, the alignment mark is formed above the protruding portion. Accordingly, the electro-optic panel of the present invention is particularly useful, for example, when the alignment of a circuit board for connection (for example, a flexible circuit board) or a driver IC with the electro-optic panel is performed.

The electro-optic panel described above can be preferably used as a liquid crystal panel. In addition, the electro-optic panel can be more particularly used as a reflective liquid crystal panel and as a transflective liquid crystal panel.

The material for the planarized layer is not specifically limited; however, the material is preferably similar to that for the first substrate in terms of an optical characteristic. The optical characteristic mentioned above is refractive index. In addition, the similarity of the optical characteristic means that the values of the refractive indexes thereof are close to each other. As a material used for the planarized layer, acrylic resins, polyimide resins, polyamide resins, polyacrylic amide resins, and polyethylene terephthalate resins may be mentioned as examples.

As a material used for the mark, the material is not specifically limited so long as the mark can be visually [or optically] detected, and for example, a material primarily composed of indium tin oxide, aluminum, silver, chromium, tantalum, or nickel may be mentioned.

An electro-optic panel may have one of the structures described below.

(1) First, the electro-optic panel may further comprise an electrode layer formed on the first substrate, in which the electrode layer and the mark may be composed of the same material. Since the material for the electrode layer is the same as that for the mark, the electrode layer and the mark may be formed in the same step. As a material mentioned above, a material primarily composed of indium tin oxide, tantalum, aluminum, silver, chromium, or nickel may be mentioned as an example.

(2) The electro-optic panel may further comprise a reflective layer formed on the first substrate, in which the reflective layer and the mark may be composed of the same material. Since the material for the reflective layer is the same as that for the mark, the reflective layer and the mark may be formed in the same step. As a material mentioned above, a material primarily composed of aluminum, silver, chromium, or nickel may be mentioned as an example.

Furthermore, the electro-optic panel may have the structure described below.

The electro-optic panel described above may further comprise a coloring layer and a protective layer for protecting the coloring layer, in which the planarized layer and the protective layer may be composed of the same material.

Since the planarized layer and the protective layer are composed of the same material, the planarized layer and the protective layer may be formed in the same step.

The electro-optic panel of the present invention can be manufactured by, for example, the following method.

The method for manufacturing an electro-optic panel comprising a first substrate and a second substrate opposing each other, in which the first substrate has a protruding portion formed so that an edge portion thereof protrudes toward the outside from an edge portion of the second substrate, and in which a surface of the first substrate opposing the second substrate is an irregular surface, the method comprising the following steps (a) and (b):

(a) a step of forming a planarized layer on the irregular surface in the protruding portion; and (b) a step of forming a mark on the planarized layer.

In this context, the mark is an alignment mark or a mark for process control.

According to the method for manufacturing the electro-optic panel, since the mark is formed on the planarized layer, a preferable mark, which can be visually detected, may be formed.

Preferable applications of the electro-optic panels obtained by the manufacturing method therefor described above are equivalent to those described in the section related to Electro-Optic Panel.

Materials used for the planarized layer and for the mark are similar to those described in the section Electro-Optic Panel.

The method for manufacturing the electro-optic panel described above may be performed in accordance with one of the methods described below.

(1) First, a method for manufacturing an electro-optic panel may further comprise a step of forming an electrode layer on the first substrate, in which the mark and the electrode layer may be formed in the same step. In the method described above, as a material used for the mark and the electrode layer, a material primarily composed of indium tin oxide, tantalum, aluminum, silver, chromium, or nickel may be mentioned as an example.

(2) Second, a method for manufacturing an electro-optic panel may further comprise a step of forming a reflective layer on the first substrate, in which the mark and the reflective layer are formed in the same step. In the method described above, as a material for the mark and the reflective layer, a material primarily composed of aluminum, silver, chromium, or nickel may be mentioned.

In addition, the method for manufacturing an electro-optic panel may be performed in accordance with a method described below.

That is, the method for manufacturing an electro-optic panel may further comprise a step of forming a coloring layer on the first substrate and a step of forming a protective layer for protecting the coloring layer, in which the planarized layer and the protective layer may be formed in the same step.

The electro-optic device of the present invention comprises the electro-optic panel according to one of the above. These electro-optic devices can be manufactured at, for example, a higher yield due to the advantages of the electro-optic panel.

The electronic apparatus of the present invention comprises the electro-optic device according to the above. This electronic apparatus can be manufactured at, for example, a higher yield due to the advantages of the electro-optic device.

DETAILED DESCRIPTION OF THE PREFERRED EMBODIMENTS

Hereinafter, the preferred embodiments of the present invention will be described with reference to accompanying drawings.

Hereinafter, a liquid crystal display panel (an electro-optic panel) of the first embodiment and a method for manufacturing the liquid crystal display panel will be described.

The liquid crystal display panel of the first embodiment will be described. The liquid crystal display panel of the first embodiment is a reflective liquid crystal display panel. In particular, the liquid crystal display panel of the first embodiment is a reflective liquid crystal display panel for use in a passive matrix addressed [or driving] liquid crystal display device.

Figure 1:
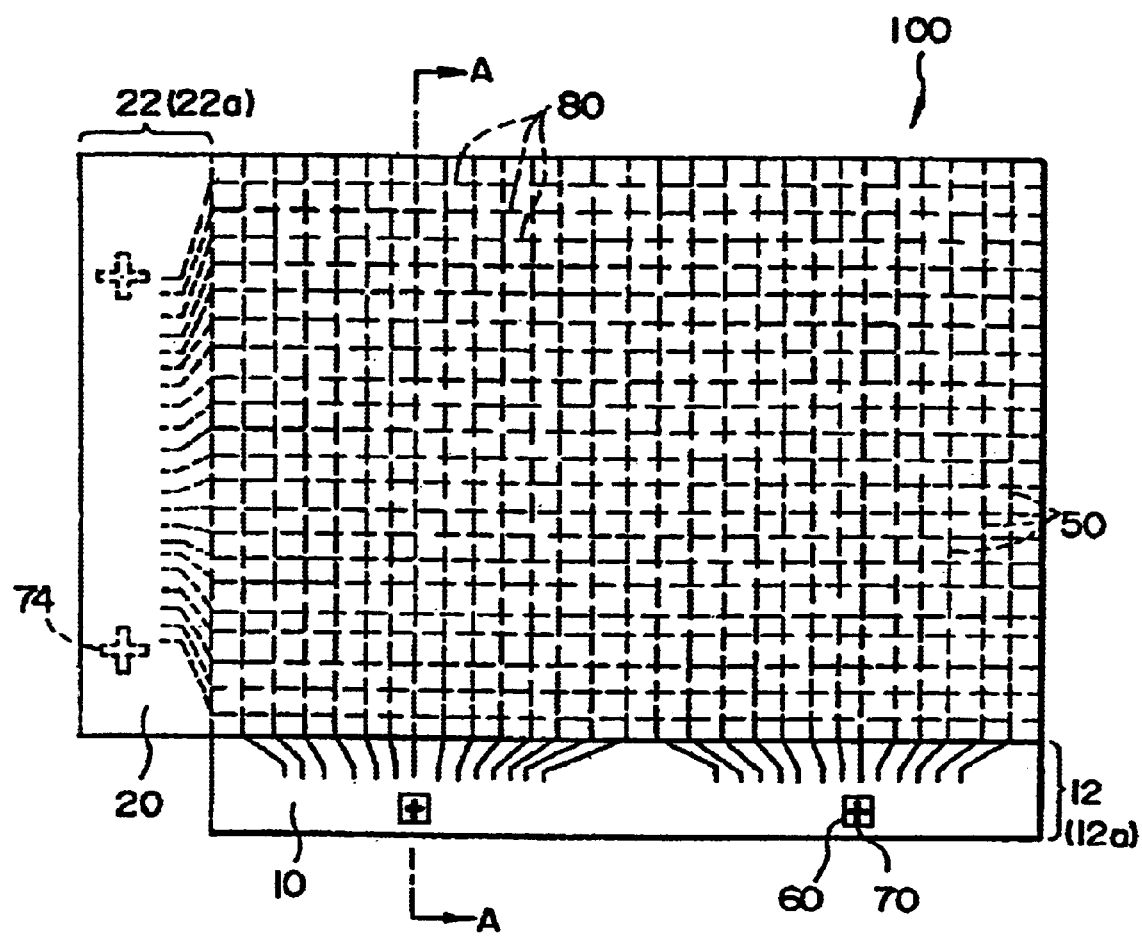
FIG. 1 is a schematic plan view of a liquid crystal display panel of the first embodiment.

The planar structure of the liquid crystal display panel is first described. FIG. 1 is a schematic plan view showing the liquid crystal display panel of the first embodiment.

A liquid crystal display panel 100 has a first substrate 10 and a second substrate 20. The first substrate 10 and the second substrate 20 oppose each other.

At a predetermined side edge portion of the liquid crystal display panel 100 (a lower side in FIG. 1), the first substrate 10 is disposed so that an edge portion thereof protrudes toward the outside from an edge portion of the second substrate 20. That is, the first substrate 10 has a portion (hereinafter referred to as a "protruding portion of the first substrate") 12 that does not overlap the second substrate 20. The protruding portion 12 of the first substrate 10 forms a first wiring joint area 12a.

In the protruding portion 12 of the first substrate 10, alignment marks 70 are formed at predetermined locations. The alignment marks 70 of the first substrate 10 are formed on a planarized layer 60 formed on the first substrate 10. The planar shape of the alignment mark 70 is not specifically limited so long as it is visually [or optically] detectable, and an alignment mark in the form of a cross (see in FIG. 1), an L, a circle, or a rectangle may be mentioned as an example.

In addition, the second substrate 20 is disposed so that an edge portion thereof protrudes toward the outside from an edge portion of the first substrate 10. That is, the second substrate 20 has a portion (hereinafter referred to as a "protruding portion of the second substrate") 22 that does not overlap the first substrate 10. The protruding portion 22 of the second substrate 20 forms a second wiring joint area 22a. In the protruding portion 22 of the second substrate 20, alignment marks 74 are formed at predetermined locations.

Figure 2:
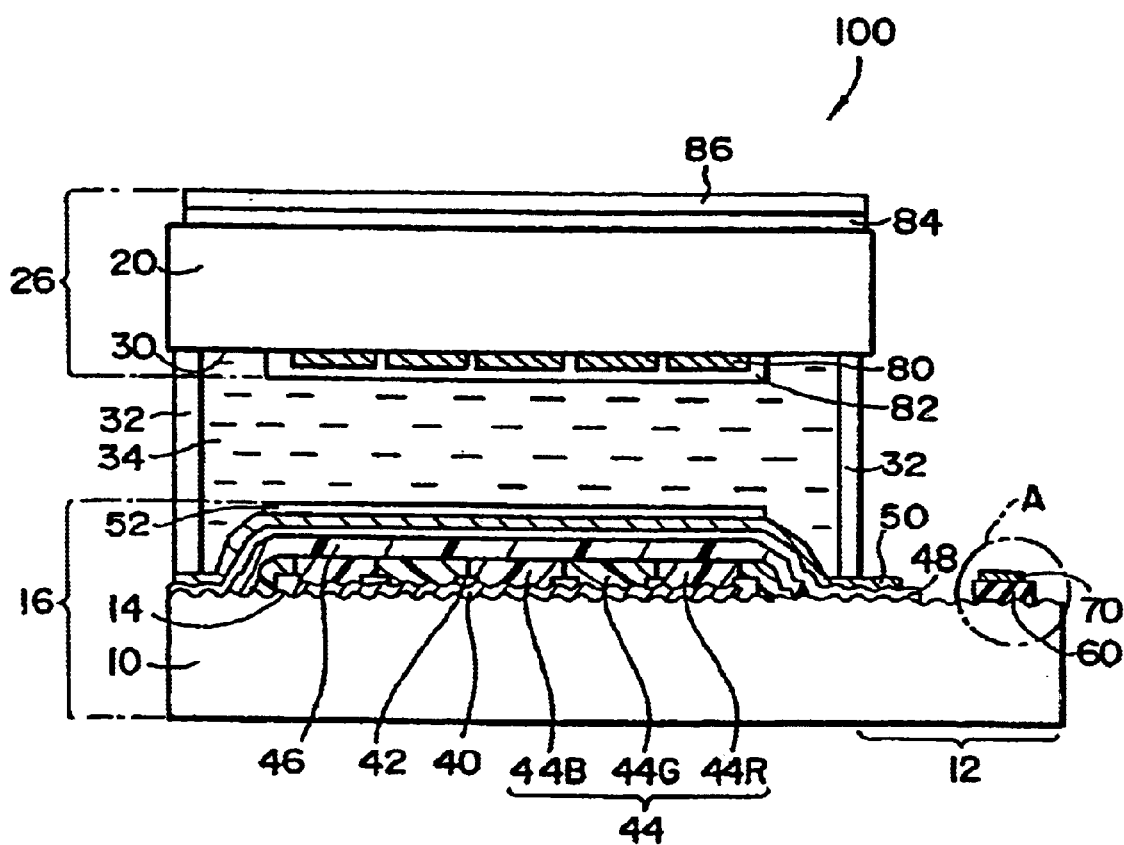
FIG. 2 is a schematic cross-sectional view along the line A—A in FIG. 1.

Next, the cross-sectional structure of the liquid crystal display panel 100 will be described. FIG. 2 is a schematic cross-sectional view taken along the line A—A in FIG. 1.

At the periphery between the first substrate 10 and the second substrate 20, a sealing member 32 is formed. Since the sealing member 32 is formed, a predetermined gap (hereinafter referred to as a "cell gap") 30 between the first substrate 10 and the second substrate 20 is maintained. In addition, in the cell gap 30, liquid crystal is enclosed, and hence, a liquid crystal layer 34 is formed.

On the surface of the first substrate 10, a layered structure [laminate] is formed. Hereinafter, the first substrate 10 and the layered structure formed on the first substrate 10 are collectively referred to as a "first panel 16". Furthermore, on the surface of the second substrate 20, a layered structure is formed. Hereinafter, the second substrate 20 and the layered structure formed on the second substrate 20 are collectively referred to as a "second panel 26".

Hereinafter, the first panel 16 and the second panel 26 will be described in detail.

The first panel 16 will first be described in detail.

The surface of the first substrate 10 opposing the second substrate 20 is formed so as to have an irregular surface 14. The irregular surface 14 scatters incident light thereon from the outside of the second substrate 20 together with a reflective layer described later so as to increase the viewing angle. The first substrate 10 is transparent and is composed of, for example, a glass substrate.

On the irregular surface 14 inside the sealing member 32 (inside the cell gap 30), a reflective layer 40 is formed. The shape of the surface of the reflective layer 40 conforms to the shape of the irregular surface 14. The reflective layer 40 serves to reflect incident light thereon from the outside of the second substrate 20. A material used for the reflective layer 40 is not specifically limited so long as the material reflects incident light thereon from the outside of the second substrate 20, and a material primarily composed of, for example, aluminum, silver, chromium, or nickel may be mentioned as an example.

On the reflective layer 40, a shading layer 42 having a predetermined pattern is formed.

The shading layer 42 serves to absorb light for display. As a material used for the shading layer 42, resin black, multi-layer chromium, or the like may be mentioned.

On the reflective layer 40 and the shading layer 42, a coloring layer 44 is formed. The coloring layer 44 is formed of, for example, three types of colored resin layers disposed in accordance with a predetermined pattern, i.e., resin layers 44R, 44G, and 44B having the color of red (R), green (G), and blue (B), respectively.

On the coloring layer 44, a protective layer 46 is formed. The surface of the protective layer 46 is planarized. The protective layer 46 serves to protect the coloring layer 44. A material used for the protective layer 46 is not specifically limited; however, a material having an optical characteristic similar to that of the material used for the first substrate 10 is preferable. The optical characteristic mentioned above is refractive index. As materials having the optical characteristic similar to that of the first substrate 10, acrylic resins, polyimide resins, polyamide resins, polyacrylic amide resin, polyethylene terephthalate resin, and the like may be mentioned.

On the protective layer 46, a cohesion-improving layer 48 is formed. The cohesion-improving layer 48 extends to the midway of the protruding portion 12 of the first substrate 10. The cohesion-improving layer 48 serves to improve cohesion between a first electrode layer 50 described below and the protective layer 46 and the first substrate 10.

On the cohesion-improving layer 48, the first electrode layer 50 is formed. The first electrode layer 50 is composed of a plurality of electrodes disposed in parallel with each other at predetermined intervals in a predetermined direction (see FIG. 1). The first electrode layer 50 functions as signal electrodes or scanning electrodes. A material used for the first electrode layer 50 is not specifically limited so long as the material is electroconductive and transparent to incident light and reflected light (light for display), and the material may be composed of, for example, indium tin oxide (ITO).

On the first electrode layer 50 inside the sealing member 32 (inside the cell gap 30), a first alignment film 52 is formed. The first alignment film 52 is a film that aligns liquid crystal molecules in a predetermined orientation state relative to the first substrate 10.

Figure 3:
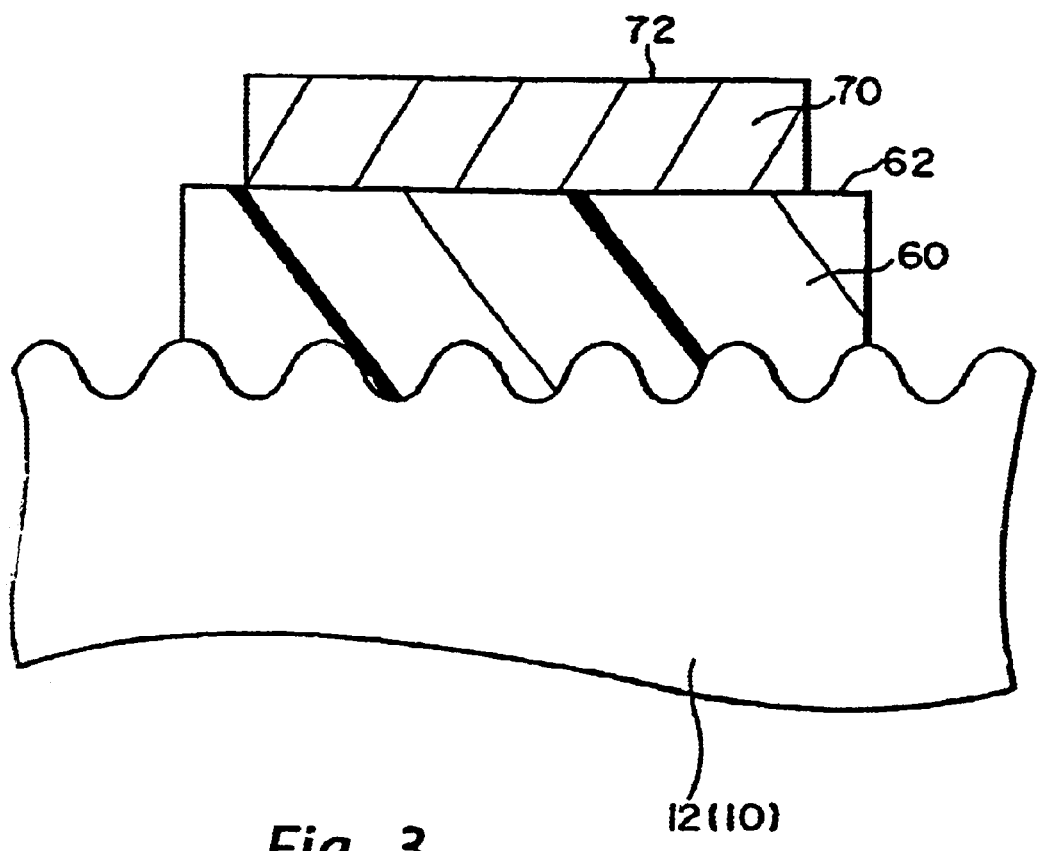
FIG. 3 is an enlarged view of A in FIG. 2.

Next, the structure of the alignment mark 70 will be described. The structure of the alignment mark 70 is one of the features of this embodiment. FIG. 3 is an enlarged view of A in FIG. 2.

At a predetermined location on the irregular surface 14 of the first substrate 10 in the protruding portion 12 thereof (outside the sealing member 32), the planarized layer 60 is formed. The upper surface 62 of the planarized layer 60 is flat. A material used for the planarized layer 60 is not specifically limited; however, a material similar to that used for the protective layer 46 is preferable.

Since the material for the planarized layer 60 is similar to that of the protective layer 46, the planarized layer 60 and the protective layer 46 can be formed in the same step. In addition, it is preferable that a material for the planarized layer 60 be similar to that for the first substrate 10 in terms of optical characteristics. Since the material for the planarized layer 60 is similar to the first substrate 10 in terms of optical characteristics, they can be optically considered to be one unit, and hence, the reflection and refraction of light at the interface between the planarized layer 60 and the first substrate 10 can be avoided.

On the planarized layer 60, the alignment mark 70 is formed. The upper surface 72 of the alignment mark 70 is a flat surface. The flat surface mentioned above is a surface planarized to a degree so that the visual [or optical] detection of the alignment mark 70 can be reliably performed. The material used for the alignment mark 70 is not specifically limited; however, it is preferable that the material be similar to that used for the first electrode layer 50. When the material for the alignment mark 70 is similar to that for the first electrode layer 50, the alignment mark 70 can be formed in the same step as the step in which the first electrode layer 50 is formed.

Hereinafter, the second panel 26 will be described in detail.

On the surface of the second substrate 20 at the first substrate 10 side, a second electrode layer 80 is formed. The second substrate 20 is transparent and is composed of, for example, a glass substrate. The second electrode layer 80 is composed of a plurality of electrodes disposed in parallel with each other at predetermined intervals in a predetermined direction (see FIG. 1). The second electrode layer 80 functions as signal electrodes or scanning electrodes. The material used for the second electrode layer 80 is not specifically limited so long as the material is electroconductive and transparent to incident light and reflected light (light for display), and the material may be composed of, for example, indium tin oxide (ITO). The first electrode layer 50 formed on the first substrate 10 and the second electrode layer 80 formed on the second substrate 20 are orthogonal to each other and are provided with the liquid crystal layer 34 therebetween. That is, the first electrode layer 50 and the second electrode layer 80 form a so-called X-Y matrix. A second alignment film 82 is formed so that it covers the second electrode layer 80. The second alignment film 82 is a film that aligns liquid crystal molecules in a predetermined orientation state relative to the second substrate 20.

A retardation film 84 and a polarizer 86 are sequentially formed on a surface of the second substrate 20, which is at a side opposite to the first substrate 10.

Hereinafter, features and effects of the liquid crystal display panel 100 according to the embodiment will be described. For example, the embodiment has the following features.

(1) A feature is that the upper surface 72 of the alignment mark 70 is a flat surface. Accordingly, at the upper surface 72 of the alignment mark 70, scattering of light is reduced. As a result, for example, in an alignment for connection between the liquid crystal display panel 100 and a flexible circuit board, visual detection of the alignment mark 70 can be preferably performed optically. The flexible circuit board mentioned above is to be connected with the liquid crystal display panel 100 in order to input driving signals thereto. As a result, according to the liquid crystal display panel 100 of the embodiment, for example, the alignment between the liquid crystal display panel 100 and the flexible circuit board can be more precisely performed than that when the upper surface of the alignment mark has an irregular surface.

Furthermore, in addition to the alignment between the liquid crystal display panel 100 and the flexible circuit board, the case in which a semiconductor chip for driving is directly mounted on the liquid crystal display panel 100 is also similar to the above.

In this connection, the alignment mark may be formed in an area in the protruding portion 12 of the first substrate 10 at which the flexible circuit board or the semiconductor chip is not mounted.

(2) A feature is that the alignment mark 70 is formed on the planarized layer 60. Accordingly, the upper surface 72 of the alignment mark 70 can be formed into a flat surface above the irregular surface by a simple method, as is described later.

(3) A feature is that the alignment mark 70 is formed on the protruding portion 12 of the first substrate 10, i.e., outside the sealing member 32. Accordingly, compared to the case in which the alignment mark 70 is formed inside the sealing member 32 (inside the cell gap 30), for example, absorption, refraction, and reflection of light by a medium positioned above the alignment mark 70 can be avoided. In addition, since the alignment mark is formed outside the sealing member 32, this is particularly effective during the alignment of the liquid crystal display panel 100 and the flexible circuit substrate or the driver IC.

Furthermore, in the liquid crystal display panel 100 of the embodiment, it is preferable that the material used for the planarized layer 60 be similar to that for the first substrate 10 in terms of optical characteristics. When the material for the planarized layer 60 is as describe above, the first substrate 10 and the planarized layer 60 can be optically considered to be one unit, and hence, the reflection and the refraction of light at the interface between the planarized layer 60 and the first substrate 10 can be avoided.

The liquid crystal display panel 100 can be manufactured, for example, as described below.

Next, the method for manufacturing the liquid crystal display panel 100 of the first embodiment will be described.

The liquid crystal display panel 100 can be formed by the steps of forming the first panel 16 and the second panel 26 separately, adhering the first panel 16 and the second panel 26 to each other, and enclosing liquid crystal therebetween. Hereinafter, the method for manufacturing the liquid crystal display panel 100 of the embodiment will be described in detail.

Hereinafter, the method for manufacturing the first panel will be described. FIGS. 4 and 5 show cross-sectional views illustrating manufacturing steps for the first panel 16.

(1) Formation of Irregular Surface

Figure 4A:
FIG. 4 is schematic cross-sectional views showing manufacturing steps of a first panel of the first embodiment.
Figure 4B:
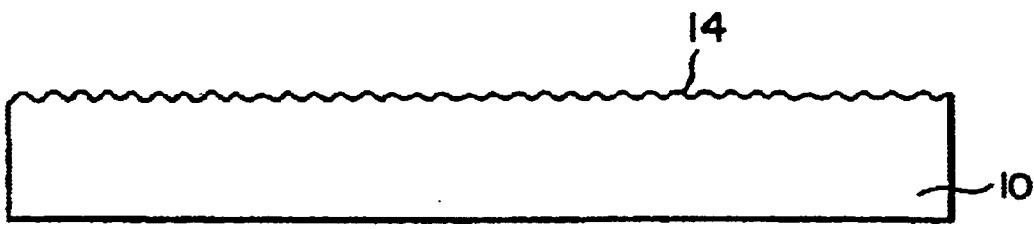

FIG. 4(a) will first be described. The first substrate 10 composed of a glass substrate is prepared. The surface of the first substrate 10 is processed to produce an irregular surface, and as a result, as shown in FIG. 4(b), the irregular surface 14 is formed. A treatment for making the surface irregular is performed by processing the surface of the first substrate using a treatment solution for a predetermined time at a predetermined temperature. The treatment solution is a solution in which an etching rate for each small area of the surface of the first substrate 10 varies. As a treatment solution for producing an irregular surface, an aqueous solution containing hydrofluoric acid (e.g., 30 wt %) or ammonium hydrogen difluoride (e.g., 45 wt %) may be mentioned as an example. When the treatment solution described above is used, the surface of the first substrate 10 can be formed into the irregular surface 14 by a treatment at 25° C. for 15 seconds.

(2) Formation of Reflective Layer

Figure 4C:
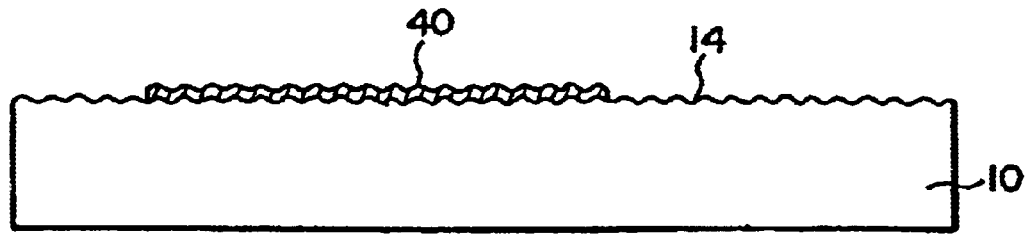

Next, as shown in FIG. 4(c), on the irregular surface 14, the reflective layer 40 having a predetermined pattern is formed. The reflective layer 40 is formed by, for example, a method described below. On the irregular surface 14, a layer (not shown) having reflective properties is formed. A material having reflective properties is not specifically limited so long as the material reflects incident light thereon from the outside of the second substrate 20, and for example, a material primarily composed of aluminum, silver, chromium, or nickel may be mentioned as an example. As a method for forming the layer having reflective properties, sputtering or deposition (such as a CVD method) may be mentioned as an example. The thickness of the layer having reflective properties is not specifically limited so long as the layer satisfies function as the reflective layer 40; however, the thickness is, for example, 0.1 to 0.2 μm. The layer having reflective properties is patterned by a lithographical method and an etching method, thereby forming the reflective layer 40.

(3) Formation of Shading Layer

Figure 4D:
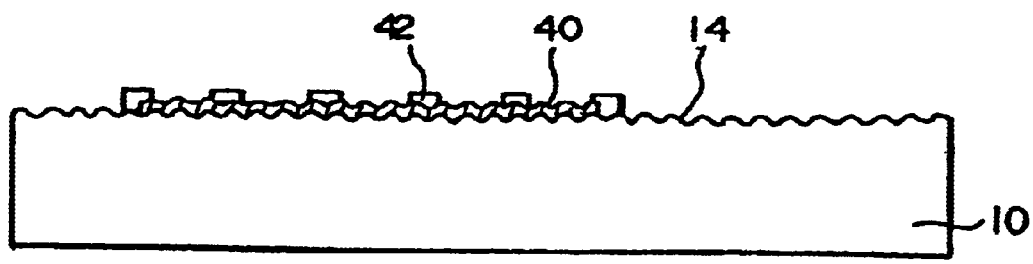

Next, as shown in FIG. 4(d), on the reflective layer 40, the shading layer 42 having a predetermined pattern is formed by a method described below. On the reflective layer 40, a layer (not shown) having shading properties is formed. A material having shading properties is not specifically limited so long as the material absorbs incident light and reflected light (light for display), and resin black and multilayer chromium may be mentioned as examples. When the layer having shading properties is formed of resin black, a layer having shading properties can be formed by coating a resin compound obtained from a polyimide resin or an acrylic resin dispersed with a black dyestuff, a black pigment, or a carbon black. When the layer having shading properties is formed of multilayer chromium, a layer having shading properties can be formed by laminating a chromium film and a chromium oxide film by sputtering.

The thickness of the layer having shading properties is not specifically limited so long as the layer satisfies function as the shading layer 42, and the thickness thereof is, for example, 0.1 to 0.2 μm. The layer having shading properties is patterned by a photolithographic method and an etching method, thereby forming the shading layer 42.

(4) Formation of Coloring Layer

Figure 5A:
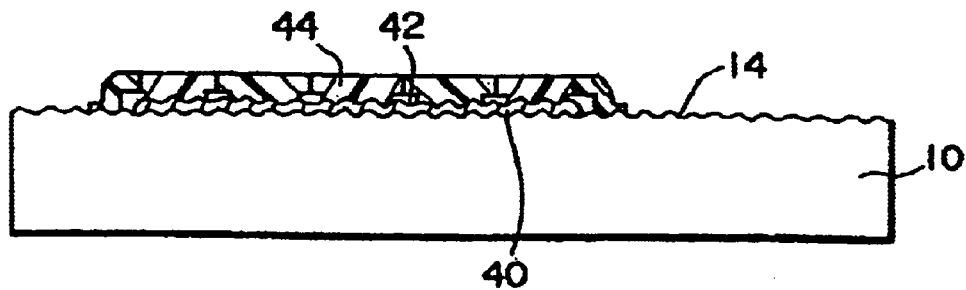
FIG. 5 is schematic cross-sectional views showing manufacturing steps of the first panel of the first embodiment.

Next, as shown in FIG. 5(a), on the reflective layer 40 and the shading layer 42, the coloring layer 44 having a predetermined pattern is formed. The coloring layer 44 can be formed by a known method. When the coloring layer is composed of the three resin layers 44R, 44G, and 44B having the colors R, G, and B, respectively, the coloring layer can be formed by a method described below. A colored photosensitive resin (not shown) having a red color is coated. Next, the colored photosensitive resin is patterned by a photolithographic method and an etching method, so that the red resin layer 44R is formed. In addition, in a manner similar to that for the red resin layer 44R, the green resin layer 44G and the blue resin layer 44B are formed. As described above, the coloring layer 44 is formed. In this connection, the sequence of the formations of the red resin layer 44R, the green resin layer 44G, and the blue resin layer 44B are not specifically limited.

(5) Formation of Protective Layer and Planarized Layer

Figure 5B:
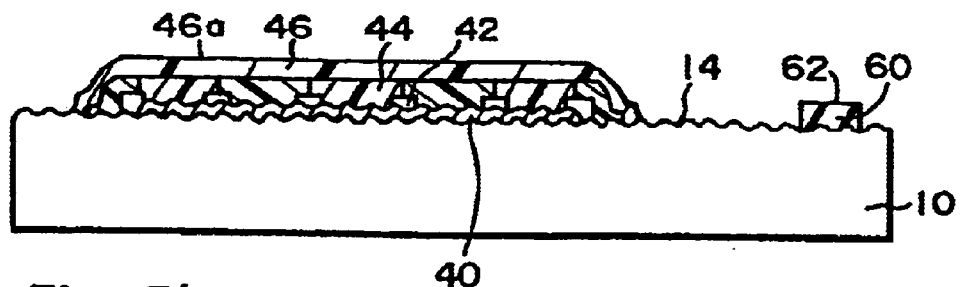

Next, as shown in FIG. 5(b), on the coloring layer 44, the protective layer 46 is formed, and the planarized layer 60 is formed on the protruding portion 12 of the first substrate 10. The protective layer 46 and the planarized layer 60 are formed so that the respective upper surfaces 46a and 62 are flat. The protective layer 46 and the planarized layer 60 can be formed in the same step. For example, as described below, the protective layer 46 and the planarized layer 60 can be formed in the same step.

On the first substrate 10, an over-coating layer (not shown) is formed. The over-coating layer is formed so that the upper surface thereof above the coloring layer 44 and above the protruding portion 12 of the first substrate 10 is flat. A method for forming the over-coating layer is not specifically limited, and various coating methods, such as a spin coating method, a roll coating method, and a dip coating method, may be mentioned as examples. The material used for the cover-coating layer is not specifically limited; however, the material preferably has optical characteristics similar to those of the first substrate 10. As a material having optical characteristics similar to those of the first substrate 10, acrylic resins, polyimide resins, polyamide resins, polyacrylic amide resins, polyethylene terephthalate resins, and the like may be mentioned as examples. The thickness of the over-coating layer is not specifically limited so long as the over-coating layer satisfies functions as the protective layer 46 and the planarized layer 60, and for example, a thickness of 1 to 3 μm may be mentioned. The over-coating layer is patterned by a photolithographic method and an etching method. As described above, the protective layer 46 is formed on the coloring layer 44, and the planarized layer 60 is formed on the protruding portion 12 of the first substrate 10.

(6) Formation of Cohesion-Improving Layer

Figure 5C:
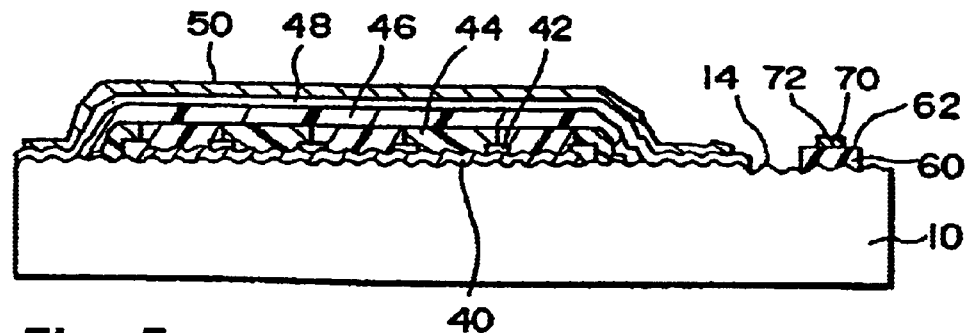

Next, as shown in FIG. 5(c), on the protective layer 46, the cohesion-improving layer 48 having a predetermined pattern is formed. The cohesion-improving layer 48 is patterned by a photolithographic method and an etching method. As a method for forming the cohesion-improving layer 48, for example, a spin coating may be mentioned. As a material used for the cohesion-improving layer 48, for example, an acrylic resin may be mentioned. As the thickness of the cohesion-improving layer 48, for example, a thickness of 0.01 to 0.03 m may be mentioned.

(7) Formations of First Electrode Layer and Alignment Mark

Next, as shown in FIG. 5(c), the first electrode layer 50 is formed on the cohesion-improving layer 48, and the alignment mark 70 is formed on the planarized layer 60. The alignment mark 70 is formed so that it is flat at the upper surface 72 thereof. The first electrode layer 50 and the alignment mark 70 can be formed in the same step. For example, as described below, the first electrode layer 50 and the alignment mark 70 can be formed in the same step.

On the first substrate 10, a first electroconductive layer (not shown) is formed. The first electroconductive layer is formed so that the upper surface thereof above the planarized layer 60 is flat. Since the upper surface 62 of the planarized layer 60 is flat, the upper surface of the electroconductive layer can be easily formed to be flat. As a method for forming the first electroconductive layer, for example, sputtering and deposition (such as a CVD method) may be mentioned. A material used for the first electroconductive layer is not specifically limited so long as the layer is electroconductive and transparent to incident light and reflected light (light for display), and ITO may be mentioned as an example. The thickness of the first electroconductive layer is not specifically limited so long as the first electroconductive layer has functions as the first electrode layer 50 and the alignment mark 70, and a thickness of 0.1 to 0.2 μm may be mentioned as an example. Next, the first electroconductive layer is patterned by a photolithographic method and an etching method. As described above, the first electrode layer 50 is formed on the cohesion-improving layer 48, and the alignment mark 70 is formed on the planarized layer 60.

(8) Formation of First Alignment Film

Figure 5D:
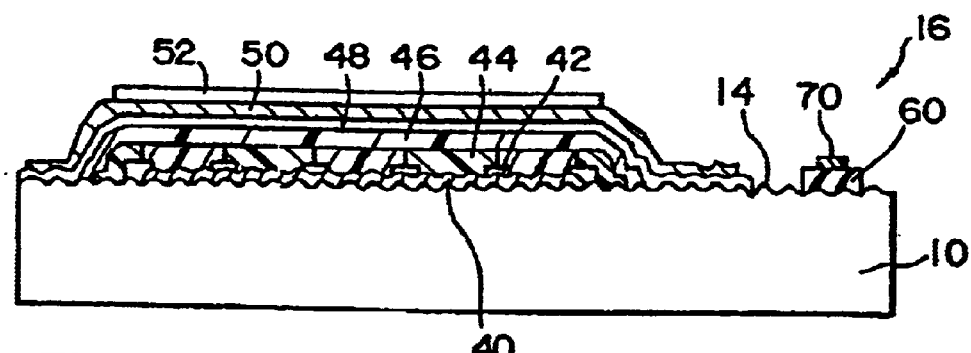

Next, as shown in FIG. 5(d), on the first electrode layer 50, the first alignment film 52 is formed. The first alignment film 52 is formed by a method as described below. That is, a polyimide resin is coated on the first substrate 10 and is then heated to 200 to 300° C., thereby forming the first alignment film 52. Next, on the surface of the first alignment film 52, a rubbing treatment is performed. The rubbing treatment is a treatment of forming rubbing grooves in which liquid crystal molecules are aligned in one direction. As a result, the first panel 16 is completed.

Figure 6A:
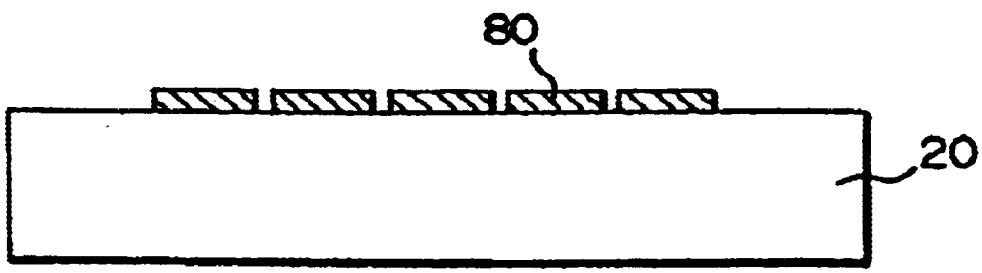
FIG. 6 is schematic cross-sectional views showing manufacturing steps of a second panel of the first embodiment.
Figure 6B:
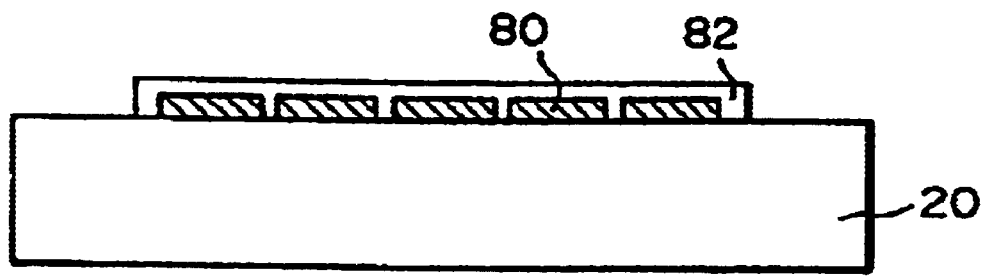
Figure 6C:
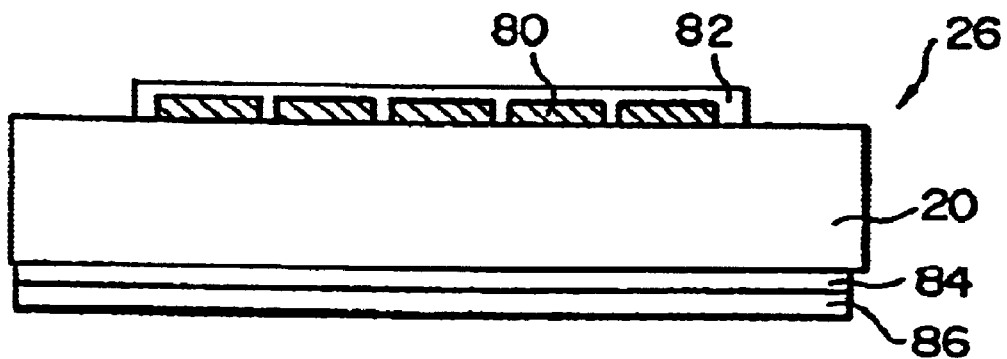

Hereinafter, the method for manufacturing the second panel 26 is described. FIG. 6 shows schematic cross-sectional views showing steps of manufacturing the second panel 26.

First, on the second substrate 20, the second electrode layer 80 having a predetermined pattern is formed. The second electrode layer 80 can be formed by, for example, a method described below.

On the second substrate 20, a second electroconductive layer (not shown) is formed. The formation method, material, and thickness of the second electroconductive layer are equivalent to those described for the first electroconductive layer described above (the formation of the first electrode layer). Next, the second electroconductive layer is patterned by a photolithographic method and an etching method. As described above, the second electrode layer 80 is formed. In addition, when necessary, the alignment mark (not shown) is formed during the step described above.

Next, on the second substrate 20, the second alignment film 82 is formed. The second alignment film 82 is formed by, for example, a method equivalent to that described for the first alignment film 52. The surface of the second alignment film 82 is then processed by a rubbing treatment.

Subsequently, on the surface of the second substrate 20, which is the side opposite to that at which the second electrode layer 80 is formed, the retardation film 84 and the polarizer 86 are sequentially formed.

Hereinafter, referring to FIG. 2, steps will be described from the adhesion of the first panel 16 and the second panel 26 to the enclosure of liquid crystal.

The first panel 16 and the second panel 26 are disposed so that they are opposed to each other. This arrangement is made so that the first alignment film 52 and the second alignment film 82 oppose each other.

Next, on one of the first substrate 10 and the second substrate 20, the sealing member 32 is formed by [e.g., screen] printing. Subsequently, the first substrate 10 and the second substrate 20 are aligned and are then compressed. Next, liquid crystal is enclosed in the cell gap 30. Consequently, the liquid crystal display panel 100 is completed.

Hereinafter, the features and the effects of the method for manufacturing the liquid crystal display panel 100 according to the embodiment will be described. In the method for manufacturing the liquid crystal display panel 100 of the embodiment, the features thereof are, for example, as follows.

(1) First, a feature is that, on the protruding portion 12 of the first substrate 10, the alignment mark 70 is formed in a manner as described below. That is, the planarized layer 60 is formed, and the alignment mark 70 is formed on the planarized layer 60.

By forming the alignment mark 70 on the planarized layer 60, the upper surface 72 of the alignment mark 70 can be made as a flat surface by a simple method.

(2) Second, a feature is that the protective layer 46 and the planarized layer 60 are formed in the same step. Accordingly, compared to the case in which the protective layer 46 and the planarized layer 60 are formed in separate steps, reduction of manufacturing steps can be achieved.

(3) Third, a feature is that the first electrode layer 50 and the alignment mark 70 are formed in the same step. Accordingly, compared to the case in which the first electrode layer 50 and the alignment mark 70 are formed in separate steps, reduction of manufacturing steps can be achieved.

Hereinafter, a liquid crystal display panel of the second embodiment and a method for manufacturing the liquid crystal display panel will be described.

A liquid crystal display panel of the second embodiment will be described.

The liquid crystal display panel (the electro-optic panel) of the second embodiment is a reflective liquid crystal display panel. In particular, the liquid crystal display panel of the second embodiment is a reflective liquid crystal display panel for use in a passive matrix addressed [or driving] liquid crystal display device. The planar structure of this liquid crystal display panel is equivalent to that of the liquid crystal display panel 100 of the first embodiment. Accordingly, the description of the planar structure of the liquid crystal display panel of the second embodiment is omitted.

Figure 7:
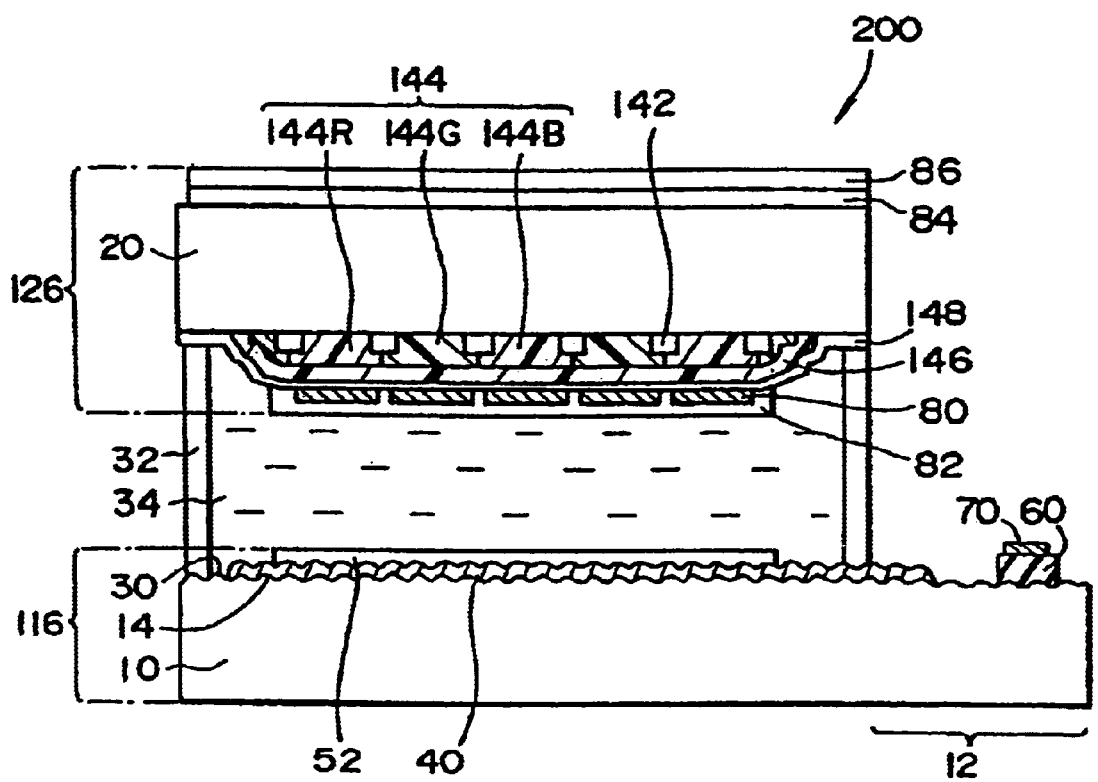
FIG. 7 is a schematic plan view of a liquid crystal display panel of the second embodiment.

FIG. 7 is a schematic cross-sectional view showing the liquid crystal display panel of the embodiment. In addition the schematic cross-sectional view in FIG. 7 is a cross-sectional view of the liquid crystal display panel of the embodiment corresponding to the part taken along the line A—A in FIG. 1.

A liquid crystal display panel 200 of the second embodiment differs from that of the first embodiment in view of the cross-sectional structure. That is, the liquid crystal display panel 200 of the second embodiment differs from that of the first embodiment in terms of the layer structures of a first panel 116 and a second panel 126. In particular, since a shading layer 142 and a coloring layer 144 are formed inside the second panel 126, the liquid crystal display panel 200 of the second embodiment differs from that of the first embodiment. The second embodiment is equivalent to the first embodiment in points other than those described above. Accordingly, the same reference numerals designate the same parts having the same functions, and detailed descriptions thereof are omitted.

Hereinafter, concerning the cross-sectional structure of the liquid crystal display panel 200 of the second embodiment, the first panel 116 and the second panel 126 will be separately described.

Hereinafter, the first panel 116 will be described in detail.

A surface of a first substrate 10 opposing a second substrate 20 is formed so as to be an irregular surface 14. On the irregular surface 14 inside a sealing member 32 (inside a cell gap 30), a reflective layer 40 is formed. In the second embodiment, the reflective layer 40 serves to reflect incident light thereon and to be an electrode layer. The material used for the reflective layer 40 is not specifically limited so long as the material reflects incident light thereon and has functions as the electrode layer, and a material primarily composed of, for example, aluminum, silver, chromium, or nickel may be mentioned as an example. On the reflective layer 40, a first alignment film 52 is formed.

Next, the structure of an alignment mark 70, which is one of the features of the second embodiment, will be described. The structure of the alignment mark 70 of the second embodiment differs from that of the first embodiment in view of a preferable material used therefor.

That is, the material used for the alignment mark 70 is preferably similar to that used for the reflective layer 40. When the material of the alignment mark 70 is similar to that of the reflective layer 40, there is an advantage in which the alignment mark 70 and the reflective layer 40 can be formed in the same step. Other than the preferable material therefor, the structure of the alignment mark 70 described above is substantially equal to that of the first embodiment, and hence, detailed description thereof is omitted.

Hereinafter, the second panel 126 will be described in detail.

On the surface of the second substrate 20 opposing the first substrate 10, the shading layer 142 having a predetermined pattern is formed. The coloring layer 144 is formed so as to cover the shading layer 142 and the upper surface of the second substrate 20. The coloring layer 144 is composed of, for example, three colored resin layers 144R, 144G, and 144B having the colors red (R), green (G), and blue (B), respectively, which are disposed in accordance with a predetermined pattern. A protective layer 146 is formed so as to cover the coloring layer 144. A cohesion-improving layer 148 is formed on the surface of the protective layer 146 and the surface of the second substrate 20. On the surface of the cohesion-improving layer 148, a second electrode layer 80 having a predetermined pattern is formed. In addition, a second alignment film 82 is formed so as to cover the second electrode layer 80.

Functions of the shading layer 142 to the second alignment film 82 described above and materials therefor are equivalent to those described in the first embodiment.

Hereinafter, the features and the advantages of the liquid crystal display panel 200 according to the second embodiment of the present invention will be described.

The features and the advantages of the liquid crystal display panel 200 according to the second embodiment are equivalent to the features (1) to (3) of the first embodiment described above, and hence, the descriptions thereof are omitted.

The liquid crystal display panel 200 described above can be manufactured by, for example, a method as described below.

Next, the method for forming the liquid crystal display panel 200 of the embodiment will be described.

The method for manufacturing the liquid crystal display panel 200 of the second embodiment differs from that of the first embodiment in terms of methods for manufacturing the first panel 116 and the second panel 126.

Hereinafter, the methods for manufacturing the first panel 116 and for manufacturing the second panel 126 will be described.

First, the method for manufacturing the first panel 116 will be described. FIG. 8 shows schematic cross-sectional views illustrating steps for manufacturing the first panel.

(1) Formation of Irregular Surface

Figure 8A:
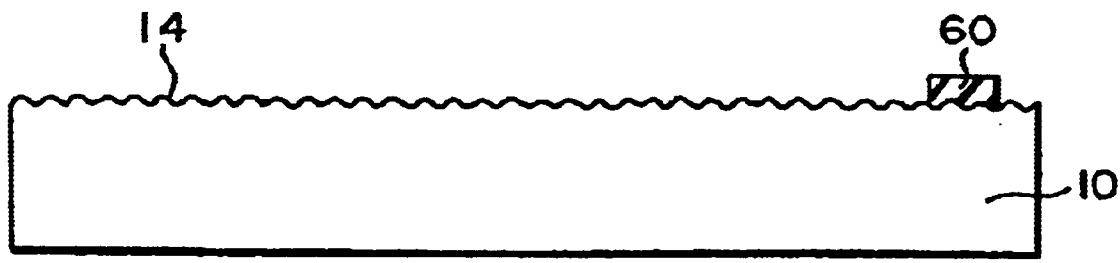
FIG. 8 is schematic cross-sectional views showing manufacturing steps of a first panel of the second embodiment.

As shown in FIG. 8(a), a treatment for making a surface irregular is performed on the surface of the first substrate 10, thereby yielding an irregular surface 14. The treatment can be performed in a manner similar to that described in the first embodiment.

(2) Formation of Planarized Layer

Next, a planarized layer 60 is formed on a predetermined location of a protruding portion 12 of the first substrate 10. The planarized layer 60 can be formed in a manner equivalent to that described in the first embodiment. That is, an over-coating layer (not shown) is formed, and the over-coating layer is then patterned, thereby forming the planarized layer 60.

(3) Formation of Reflective Layer and Alignment Mark

Figure 8B:
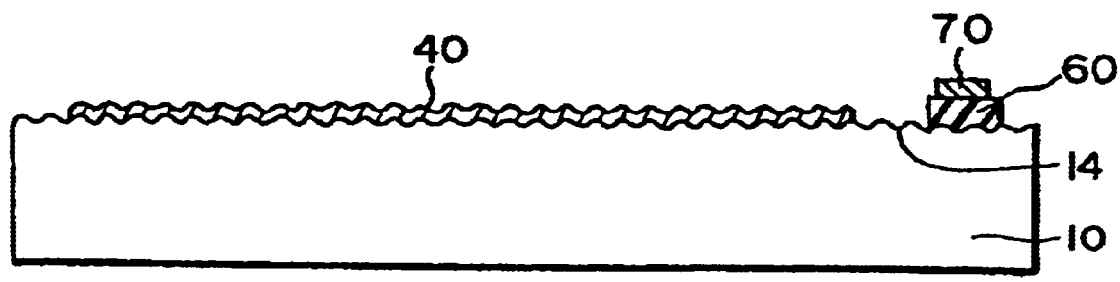
Figure 8C:
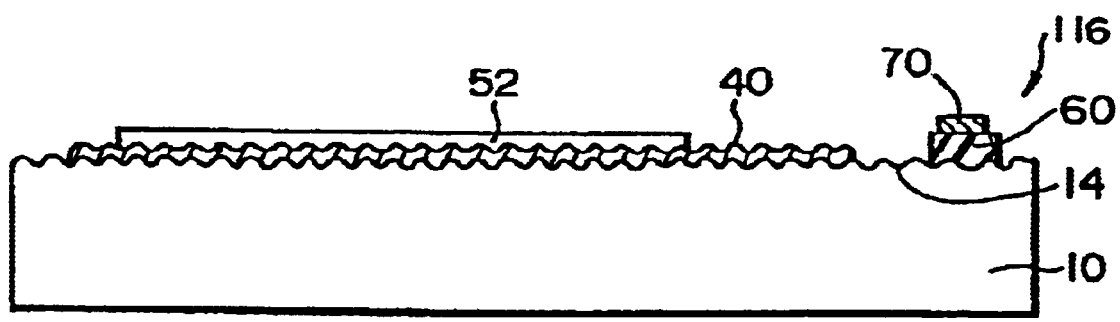
Figure 9A:
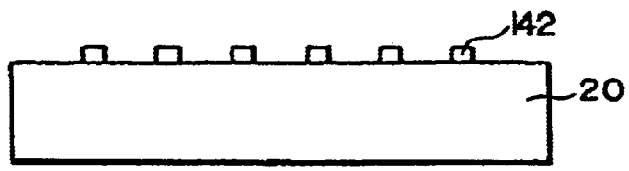
FIG. 9 is schematic cross-sectional views showing manufacturing steps of a second panel of the second embodiment.
Figure 9B:
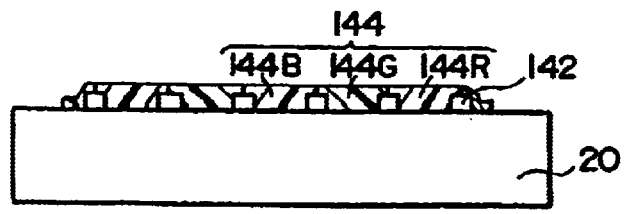
Figure 9C:
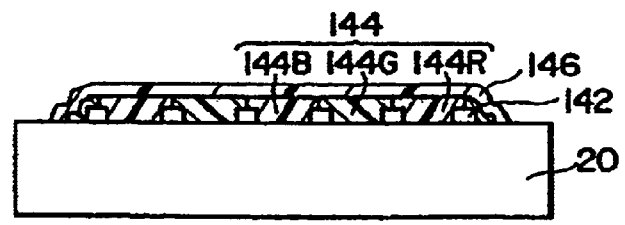
Figure 9D:
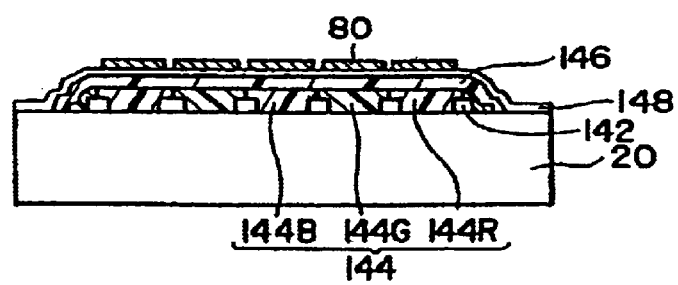
Figure 9E:
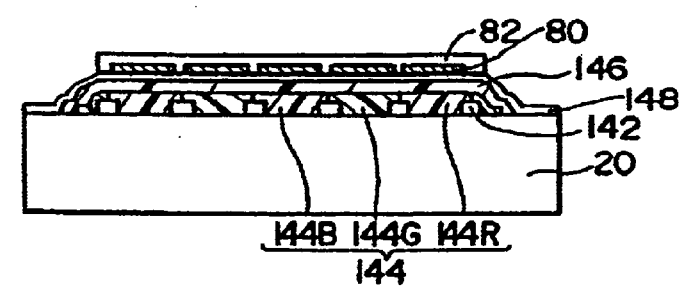
Figure 9F:
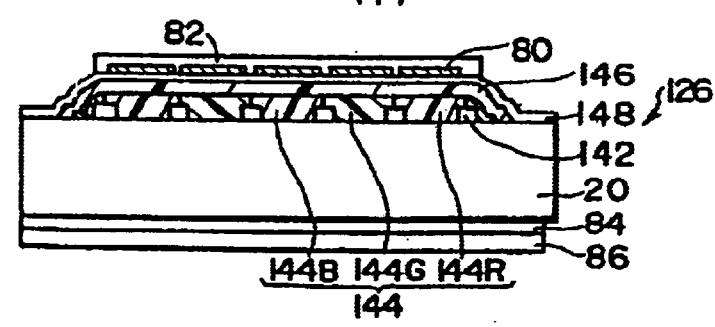

Next, as shown in FIG. 8(b), the reflective layer 40 is formed at a predetermined location on the irregular surface 14, and the alignment mark 70 is formed on the planarized layer 60. The alignment mark 70 is formed so that the upper surface thereof will be flat. The reflective layer 40 and the alignment mark 70 can be formed in the same step. For example, as described below, the reflective layer 40 and the alignment mark 70 are formed in the same step.

On the irregular surface 14 and the planarized layer 60, a layer (not shown) having reflective properties is formed. The material used for the layer having reflective properties is not specifically limited so long as the material reflects incident light, and for example, a material primarily composed of aluminum, silver, chromium, or nickel may be mentioned as an example. As a method for forming the layer having reflective properties, sputtering and deposition (such as a CVD method) may be mentioned as examples. The thickness of the layer having reflective properties is not specifically limited so long as the thickness thereof functions as the reflective layer 40 and as the alignment mark 70, and for example, a thickness is 0.1 to 0.2 μm. The layer having reflective properties is patterned by a lithographic method and an etching method, thereby forming the reflective layer 40 and the alignment mark 70.

(4) Formation of First Alignment Film

Next, as shown in FIG. 8(*c*), on the reflective layer 40, the first alignment film 52 is formed. The first alignment film 52 can be formed by a method equivalent to that described in the first embodiment. As described above, the first panel 116 is completed.

Next, the method for manufacturing the second panel 126 will be described. FIG. 9 shows schematic cross-sectional views showing steps for manufacturing the second panel. 20 As shown in FIG. 9(*a*), on the second substrate 20, the shading layer 142 having a predetermined pattern is formed. Next, as shown in FIG. 9(*b*), on the shading layer 142, the coloring layer 144 having a predetermined pattern is formed. Next, as shown in FIG. 9(*c*), the protective layer 146 is formed so as to cover the coloring layer 144. As shown in FIG. 9(*d*), on the protective layer 146, the cohesion-improving layer 148 and the second electrode layer 80 are then formed. Next, as shown in FIG. 9(*e*), on the protective layer 146 and the second electrode layer 80, the second alignment film 82 is formed. Subsequently, as shown in FIG. 9(*f*), on the surface of the second substrate 20 opposite to the surface at which the second alignment film 82 and the like are formed, a retardation film 84 and a polarizer 86 are disposed.

From the shading layer 142 to the second alignment film 82 can be formed by methods equivalent to those described in the first embodiment. As described above, the second panel 126 is completed.

Hereinafter, the features and the advantages in the method for manufacturing the liquid crystal display panel 200 of the embodiment will be described. The method for manufacturing the liquid crystal display panel 200 of the embodiment has features as described below.

(1) First, the method described above has a feature equivalent to the feature (1) of the first embodiment. Accordingly, the descriptions of the feature and the advantages are omitted.

(2) Second, a feature is that the reflective layer 40 and the alignment mark 70 are formed in the same step. Accordingly, compared to the case in which the reflective layer 40 and the alignment mark 70 are formed in separate steps, reduction of manufacturing steps can be achieved.

Hereinafter, a liquid crystal display panel of the third embodiment and a method for manufacturing the liquid crystal display panel will be described.

The liquid crystal display panel of the third embodiment will be described. The liquid crystal display panel (the electro-optics panel) of the third embodiment is a transflective liquid crystal display panel. In particular, the liquid crystal display panel of the third embodiment is a transflective liquid crystal display panel for use in a passive matrix addressed [or driving] transflective liquid crystal display device. The planar structure of the liquid crystal display panel is equivalent to that of the liquid crystal display panel 100 of the first embodiment. Accordingly, the description of the planar structure of the liquid crystal display panel of the third embodiment is omitted.

Figure 10:
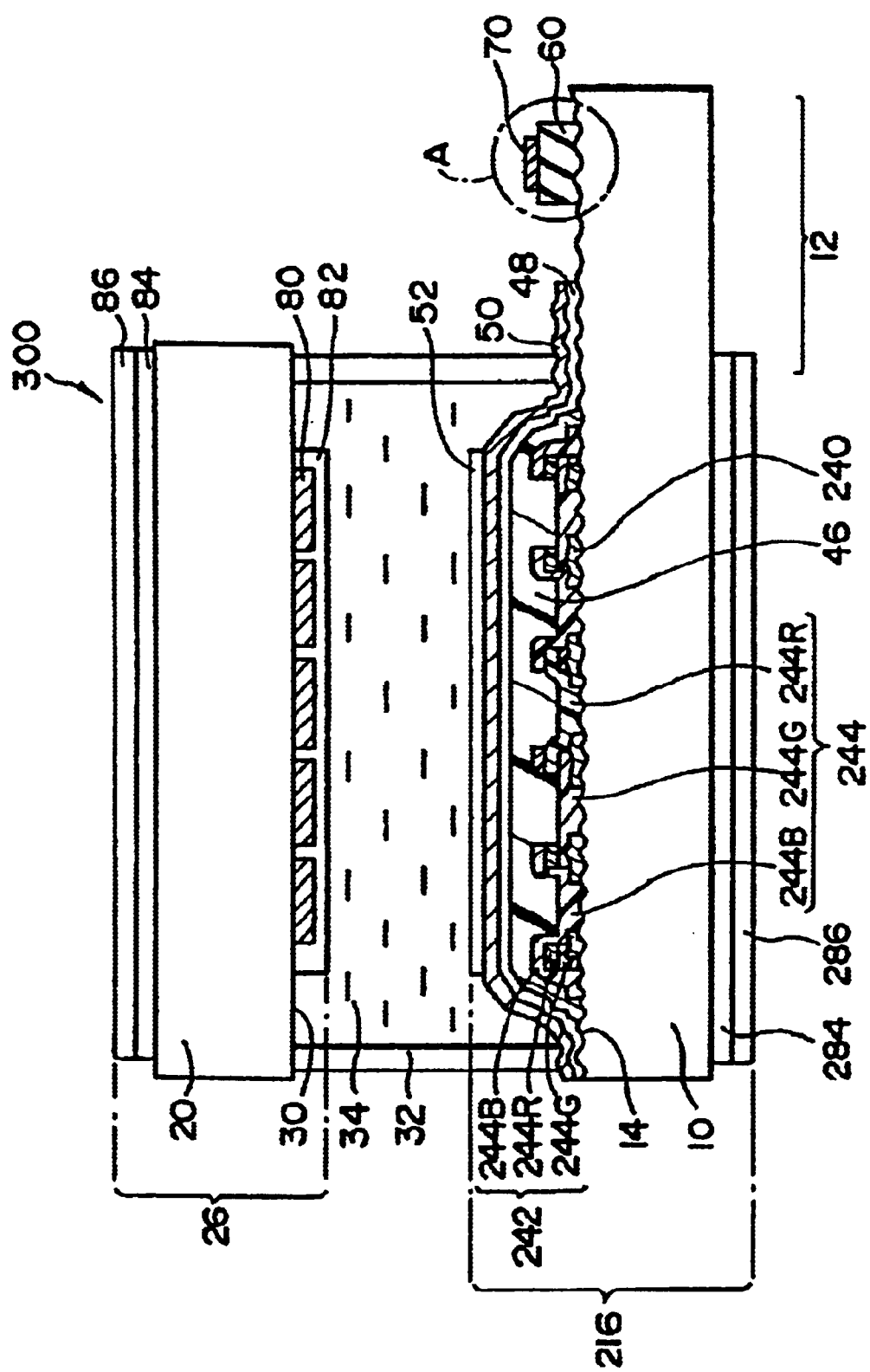
FIG. 10 is a schematic plan view of a liquid crystal display panel of the third embodiment.

FIG. 10 is a schematic cross-sectional view showing the liquid crystal display panel of the embodiment. In addition, the schematic cross-sectional view in FIG. 10 is a cross-sectional view of the liquid crystal display panel of the embodiment corresponding to the part taken along the line A—A in FIG. 1.

A liquid crystal display panel 300 of the third embodiment differs from that of the first embodiment with respect to the cross-sectional structure. In particular, the liquid crystal display panel 300 of the third embodiment differs from that of the first embodiment in terms of the layer structure of a first panel 216. The third embodiment is equivalent to the first embodiment other than those described in the first embodiment. Accordingly, the same reference numerals designate the same parts having the same functions, and the detailed descriptions thereof are omitted.

Hereinafter, the structure of the first panel 216 will be described.

A surface of a first substrate 10 is formed so as to have an irregular surface 14. On the irregular surface 14, a reflective layer 240 having a predetermined pattern is formed. That is, the reflective layer 240 has openings at predetermined locations. By the presence of the reflective layer 240, light incident on a cell gap from above a second substrate 20 (upper part in FIG. 10) can be reflected. In addition, since the reflective layer 240 has the openings, light incident on the first substrate 10 from thereunder can be passed into a cell gap 30.

On the first substrate 10 and the reflective layer 240, a coloring layer 244 is formed.

The coloring layer 244 is composed of three colored resin layers 244R, 244G, and 244B, i.e., layers having the colors red (R), green (G), and blue (B), respectively. The three colored resin layers 244R, 244G, and 244B are disposed in accordance with a predetermined pattern. In addition, areas at which the three colored resin layers 244R, 244G, and 244B are layered (areas above the reflective layer 240) serve as a shading layer 242.

Since the structure above the coloring layer 244 is equivalent to that of the first embodiment, the description thereof is omitted.

On the bottom surface of the first substrate 10, a retardation film 284 and a polarizer 286 are sequentially formed.

Since the features and the effects of the liquid crystal display panel 300 according to the third embodiment are equivalent to those of the first embodiment, the descriptions thereof are omitted.

The liquid crystal display panel 300 described above can be formed by, for example, a method described below.

Next, the method for manufacturing the liquid crystal display panel 300 of the third embodiment will be described.

The method for manufacturing the liquid crystal display panel 300 of this embodiment differs from that of the first embodiment in the method for manufacturing a first panel 216. Steps of manufacturing a second panel 26 and steps of adhesion and enclosure of liquid crystal are equivalent to those of the first embodiment. Accordingly, descriptions of the steps of manufacturing the second panel 26 and the steps of adhesion and enclosure of liquid crystal are omitted.

Hereinafter, the method for manufacturing the first panel 216 will be described. FIG. 11 shows schematic cross-sectional views illustrating manufacturing steps of the first panel 216.

(1) Formation of Irregular Surface

First, referring to FIG. 11(*a*), description will be given. The surface of the first substrate 10 is processed so as to produce an irregular surface in a manner equivalent to that in the first embodiment, thereby forming the irregular surface 14.

(2) Formation of Reflective Layer

Next, on the irregular surface 14, the reflective layer 240 having a predetermined pattern is formed.

That is, the reflective layer 240 is formed so as to have openings at predetermined locations. The reflective layer 240 is formed by, for example, a method described below. On the irregular surface, a layer (not shown) having reflective properties is formed. The layer having reflective properties is patterned by a lithographic method and an etching method, thereby forming the reflective layer 240 having a predetermined pattern. A material used for the layer having reflective properties, a forming method therefor, and the thickness thereof are equivalent to those described in the first embodiment.

(3) Formation of Coloring Layer and Shading Layer

Figure 11A:
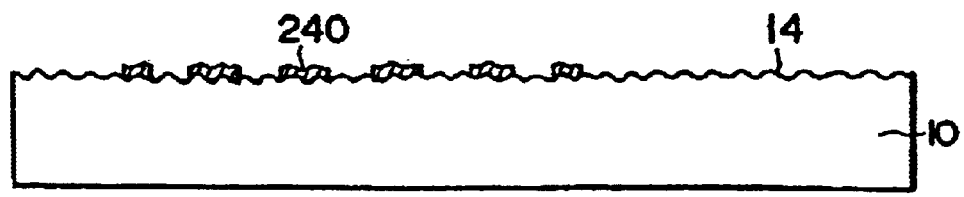
FIG. 11 is schematic cross-sectional views showing manufacturing steps of a first panel of the third embodiment.
Figure 11B:
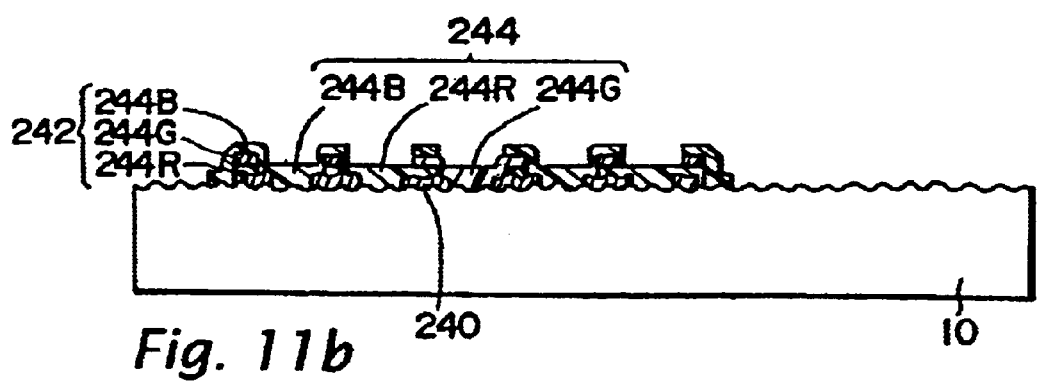
Figure 11C:
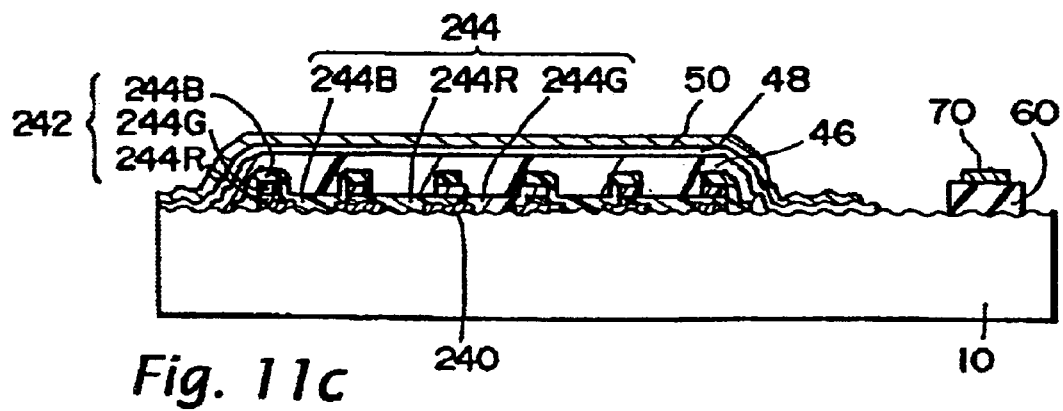

Next, as shown in FIG. 11(b), on the reflective layer 240 and the irregular surface 14, the coloring layer 244 and the shading layer 242 are simultaneously formed. The coloring layer 244 and the shading layer 242 can be simultaneously formed as described below.

A red colored photosensitive resin layer (not shown) is coated. Next, this colored photosensitive resin layer is patterned by a photolithographic method and an etching method, thereby forming the red resin layer 244R. When the red colored resin layer is patterned, in order to form the shading layer 242, the red resin layer 244R is patterned so that its remains on the reflective layer 240.

Subsequently, in a manner equivalent to that for forming the red resin layer 244R, the green resin layer 244G is formed. In the formation of the green resin layer 244G, the green resin layer is also processed so that it remains above the reflective layer 240, specifically on top of the red resin layer 244R.

Next, in a manner equivalent to that for forming the red resin layer, the blue resin layer 244B is formed. In the formation of the blue resin layer 244B, the blue resin layer is also processed so that it remains above the reflective layer 240, specifically on top of the green resin layer 244G. As described above, the coloring layer 244 is formed. In addition, simultaneously, on the reflective layer 240, the red, the green, and the blue resin layers 244R, 244G, and 244B, respectively, are stacked [laminated], whereby the shading layer 242 is formed.

In this connection, the sequence of forming the red, the green, and the blue resin layers 244R, 244G, and 244B, respectively, is not particularly limited.

Figure 11D:
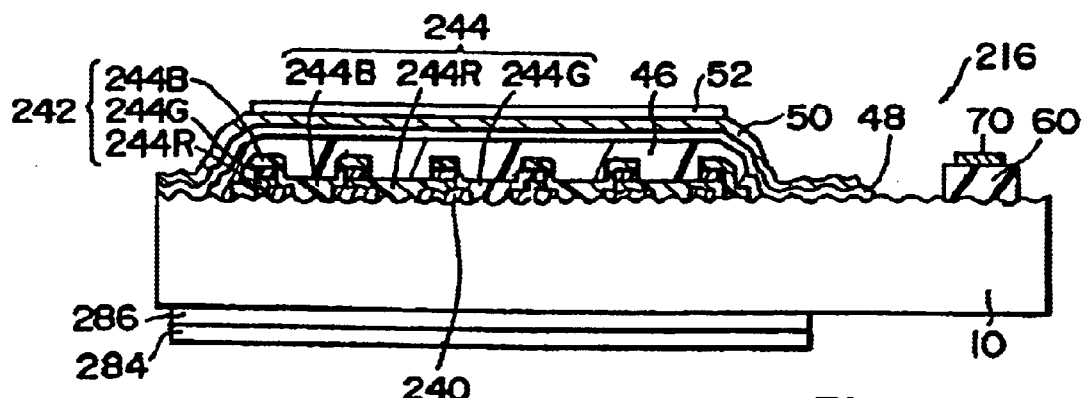

Next, as shown in FIG. 11(d), formations of a protective layer 46 to a first alignment film 52 are sequentially performed. Formations of the protective layer 46 to the first alignment film can be performed in a manner equivalent to those of the first embodiment.

Hereinafter, the features and the advantages of the method for manufacturing the liquid crystal display panel 300 according to the embodiment will be described. The features and the advantages of the method for manufacturing the liquid crystal display panel 300 according to the embodiment are equivalent to those described in the first embodiment. Accordingly, the descriptions thereof are omitted.

Hereinafter, an electro-optic device will be described to which the liquid crystal display panel (the electro-optic panel) of the present invention is applied. In the embodiment, a passive matrix addressed [or driving] liquid crystal display device will be described as the electro-optic device of the present invention.

Figure 12:
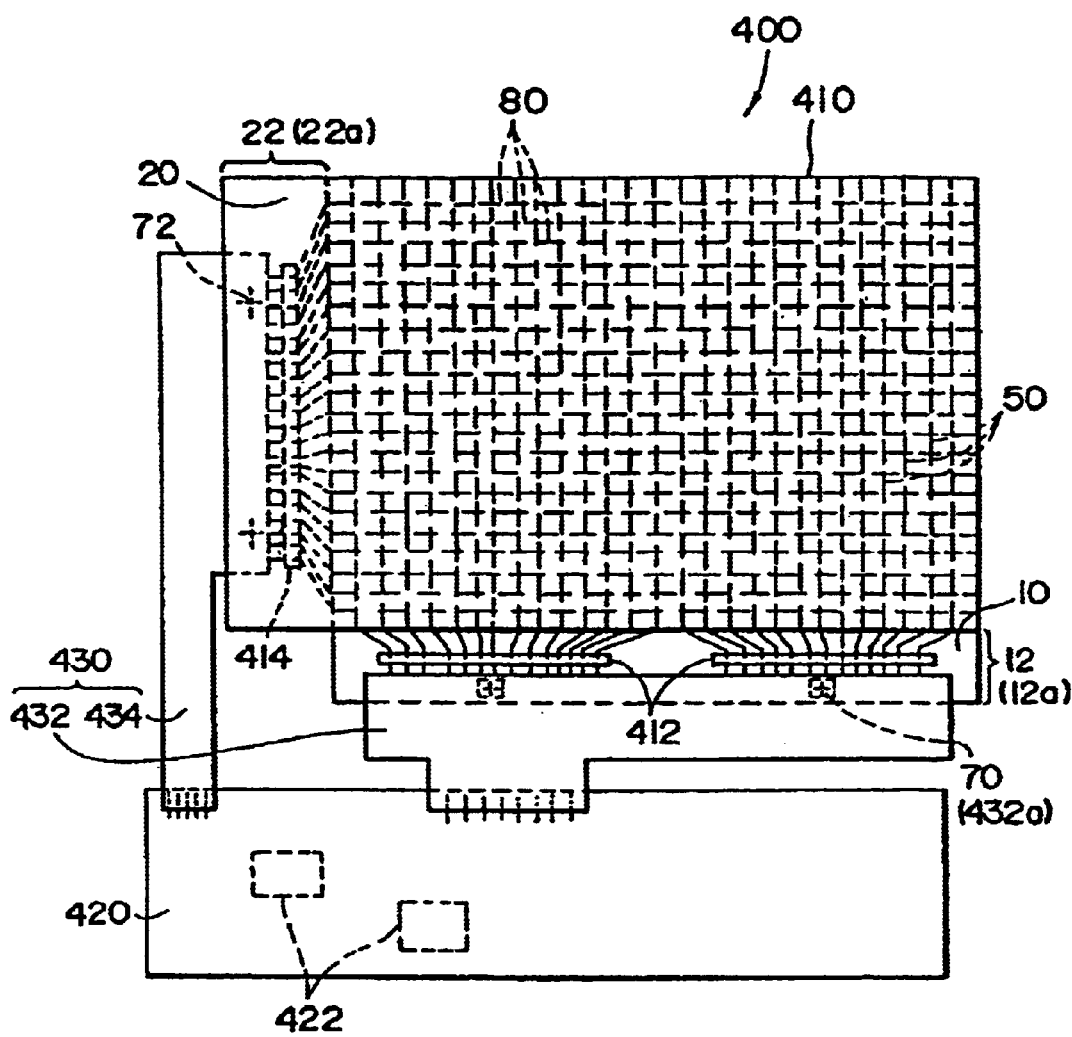
FIG. 12 is a schematic plan view showing a passive matrix addressed[or driving] liquid crystal display device to which an electro-optic device of the present invention is applied.

FIG. 12 is a schematic plan view showing a passive matrix addressed liquid crystal display device to which the electro-optic device of the present invention has been applied.

A liquid crystal display device 400 of the embodiment comprises a liquid crystal display panel 410 of the present invention, a printed circuit board 420, and a flexible circuit board 430. The liquid crystal display panel 410 and the printed circuit board 420 are electrically connected with each other via the flexible circuit board 430.

The liquid crystal display panel 410 has a first substrate 10 and a second substrate 20. The first substrate 10 and the second substrate 20 have protruding portions 12 and 22, respectively. On the protruding portion 12 of the first substrate 10 and the protruding portion 22 of the second substrate 20, driver ICs 412 and 414 are mounted, respectively. In addition, the liquid crystal display panel 410 has a first electrode layer 50 formed on the first substrate 10 and a second electrode layer 80 formed on the second substrate 20. The first electrode layer 50 functions as signal electrodes, and the second electrode layer 80 functions as scanning electrodes.

The printed circuit board 420 has a circuit that is mounted with various electronic parts 422, such as a power supply IC.

The flexible circuit board 430 has a first flexible circuit board 432 and a second flexible circuit board 434. The first flexible circuit board 432 is connected with the first substrate 10. In particular, the first flexible circuit board 432 is connected with the protruding portion 12 of the first substrate 10 (a first wiring joint area 12a). The second flexible circuit board 434 is connected with the second substrate 20. In particular, the second flexible circuit board 434 is connected with the protruding portion 22 of the second substrate 20 (a second wiring joint area 22a). In addition, the first and the second flexible circuit board 432 and 434 are respectively connected at predetermined locations on the printed circuit board 420.

Hereinafter, the alignment method of the liquid crystal display panel 410 with the flexible circuit board 430 will be described. First, an alignment method of the liquid crystal display panel 410 with the first flexible circuit board 432 will be described.

(1) An anisotropic electroconductive film (not shown) is adhered to a predetermined location of the protruding portion 12 of the first substrate 10.

(2) A camera (not shown) is disposed above or below the protruding portion 12 of the first substrate 10 so that the camera faces an alignment mark 70. As a camera, a CCD (a charge—coupled device) may be mentioned as an example.

(3) A first flexible circuit board 432 is moved relative to the liquid crystal display panel 410 so that an alignment mark 432a of the first flexible circuit board 432 and the alignment mark 70 formed on the protruding portion 12 of the first substrate 10 overlap each other. The movement described above is performed while the alignment marks 70 and 432a are monitored by the camera. In this way, the monitoring of the alignment marks 70 and 432a may be performed visually [or optically].

(4) The first flexible circuit board 432 is pressed against the first substrate 10.

(5) The anisotropic electroconductive film is cured, whereby the first flexible circuit board 432 and the first substrate 10 are joined together.

In a manner similar to the alignment method described above, the liquid crystal display panel 410 and the second flexible circuit board 434 are aligned with each other. As described above, the alignment between the liquid crystal display panel 410 and the flexible circuit board 430 is completed.

The liquid crystal display panel 410 of the present invention is applied to the liquid crystal display device 400 of the embodiment. Accordingly, by the effectiveness of the features (arrangement of the alignment mark 70) of the liquid crystal display panel 410, for example, the alignment between the liquid crystal display panel 410 and the flexible circuit board 432 can be easily performed. As a result, the liquid crystal display device 400 of the embodiment can be manufactured more easily than can a liquid crystal display device not using the liquid crystal display panel 410 of the present invention.

In the embodiment, the alignment mark 70 is used for the alignment between the liquid crystal display panel 410 and the first flexible circuit board 432. However, this is not limited only to the first flexible circuit board 432, but the alignment mark 70 may be used for, for example, alignments between the liquid crystal display panel 410 and the driver ICs 412, between the liquid crystal display panel 410 and a polarizer, and between the liquid crystal display panel 410 and a retardation film.

Hereinafter, electronic apparatuses provided with liquid crystal display devices will be described, in which the liquid crystal display devices are used for the electro-optic devices of the present invention.

(1) Digital Still Camera

Figure 13:
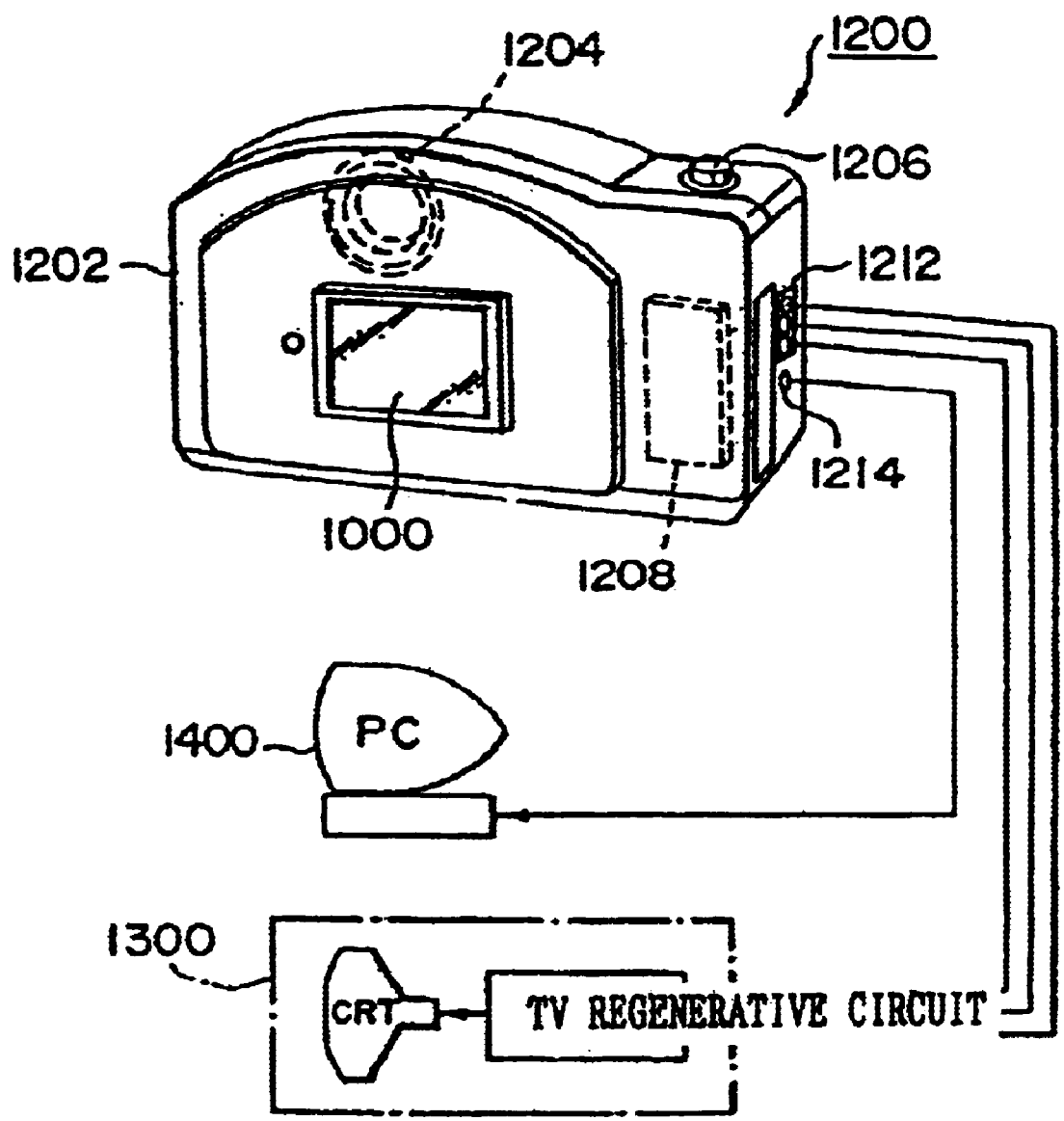
FIG. 13 is an external view of an electronic apparatus (a digital still camera) using a liquid crystal display device of the present invention.

The digital still camera using the liquid crystal display device of the present invention as a viewfinder will be described. FIG. 13 is a perspective view showing the structure of the digital still camera and also schematically showing connections thereof with external apparatuses.

A conventional camera exposes a film to an optical image of an object, whereas a digital still camera 1200 generates image signals by photoelectrically transferring an optical image of an object using a photographic device, such as a CCD (charge-coupled device). The digital still camera 1200 is provided with a liquid crystal display panel of a liquid crystal display device 1000 at the back (the front in FIG. 13) of the housing 1202 thereof, in which the digital still camera 1200 has a structure for providing display in accordance with the image signals by the CCD. Accordingly, the liquid crystal display device 1000 functions as a viewfinder to display an object. In addition, at the front (the back in FIG. 13) of the housing 1202, a light receiving unit 1204 having an optical lens or a CCD is provided.

When a photographer recognizes an object displayed on the liquid crystal display device 1000 and then presses a shutter button 1206, an image signal generated by the CCD at the time is sent to and is stored in a memory of a circuit board 1208. In addition, the digital still camera 1200 is provided with an output terminal 1212 for video signals and an input/output terminal 1214 for data communication at the side of the housing 1202. Accordingly, as shown in FIG. 13, when necessary, the former, i.e., the output terminal 1212 for video signals, is connected with a CRT monitor 1300, and the latter, i.e., the input/output terminal 1214 for data communication, is connected with a personal computer 1400. Furthermore, by a predetermined operation, the image signals stored in the memory of the circuit board 1208 are arranged so as to be outputted to the CRT monitor 1300 or to the personal computer 1400.

(2) Mobile Phone and Other Electronic Apparatuses

Figure 14A:
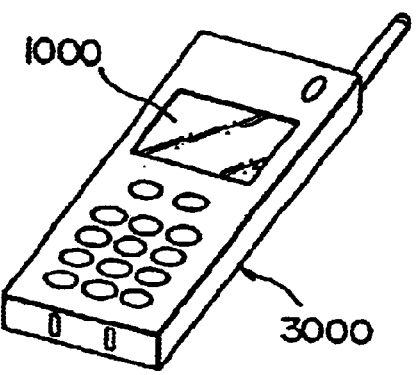
FIG. 14 is external views of electronic apparatuses using liquid crystal display devices of the present invention; (A) shows a mobile phone, (B) shows a wristwatch, and (C) shows a portable information apparatus.
Figure 14B:
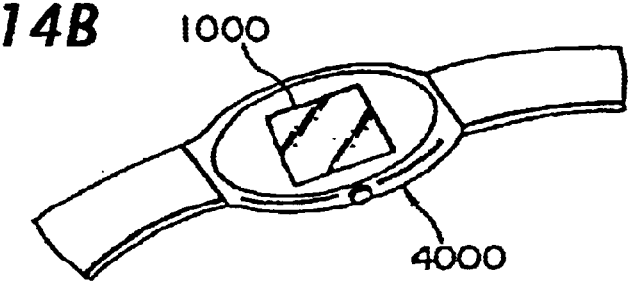
Figure 14C:
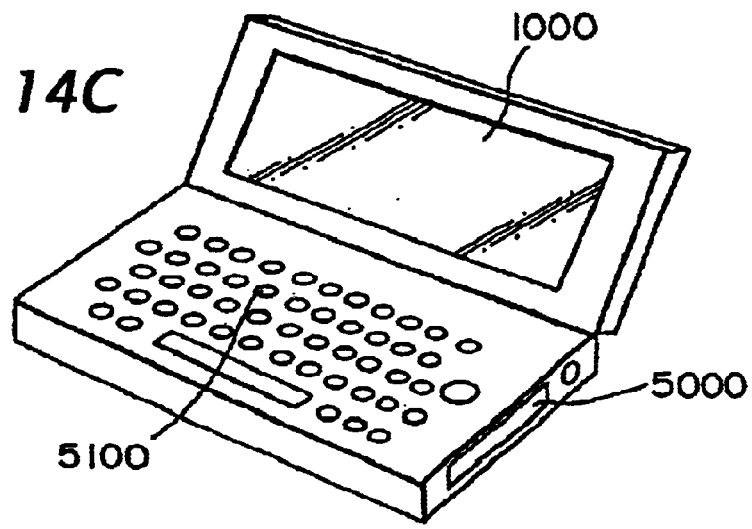

FIGS. 14(A), (B), and (C) are external views of other electronic apparatuses that use a liquid crystal display device as the electro-optic devices of the present invention. FIG. 14(A) shows a mobile phone 3000 provided with the liquid crystal display device 1000 at the upper side of the front surface thereof. FIG. 14(B) shows a wristwatch 4000 provided with the liquid crystal display device 1000 at the center of the front side thereof. FIG. 14(C) shows a mobile information apparatus 5000 comprising a display unit composed of the liquid crystal display device 1000, and an input unit 5100.

These electronic apparatuses comprise, in addition to the liquid crystal display device 1000, various circuits, which are not shown, such as an output source of display information, a processing circuit of display information, a circuit for clock generation, and a —display signal generation unit composed of, for example, a power source circuit for supplying electric power to those mentioned above.

In the case of the mobile information apparatus 5000, a display image is produced on the display unit by supplying a display signal generated in the display signal generation unit in accordance with information inputted from the input unit 5100.

In addition to digital still cameras, mobile phones, wristwatches, and mobile information apparatuses, —electronic device composed of the liquid crystal display devices of the present invention include various electronic apparatuses—such as electronic notebooks, pagers, POS terminals, IC cards, mini disk players, liquid crystal projectors, multi-media compatible personal computers (PC) and engineering work stations (EWS), notebook-type personal computers, word processors, televisions, viewfinder type and direct-view video tape recorders, electronic desk calculators, car navigation apparatuses, apparatuses provided with touch panels, and clocks.

In addition, various liquid crystal display panels can be use—. In terms of addressing methods, passive matrix liquid crystal display panels and static driven [or driving] liquid crystal display panels, which are not provided with switching elements therein, and active matrix liquid crystal display panels using, for example, a three-terminal switching element represented by a TFT (a thin-film transistor) and a two-terminal switching element represented by a TFD (a thin-film diode) may be mentioned. In terms of electro-optic characteristics, a TN-type, an STN-type, a guest-host type, a phase transition type, and a ferroelectric type liquid crystal display panel may be mentioned.

The liquid crystal display panels, the electro-optic devices, and the electronic apparatuses of the present invention are not limited to those described above, and various modifications thereof may be made within the scope of the present invention.

The liquid crystal display panels of the present invention are not limited to those described in the first to the fourth embodiments, and for example, modifications may be made as described below.

The liquid crystal display panels 100, 200, and 300 according to the first to the fourth embodiments are for use in passive matrix addressed [or driving] liquid crystal display devices. However, the liquid crystal display panel of the present invention can be applied to active matrix driving liquid crystal display devices using TFD (thin-film diode) elements as switching elements.

Hereinafter, a liquid crystal display panel applied to the active matrix driving liquid crystal display device will be described.

Figure 15:
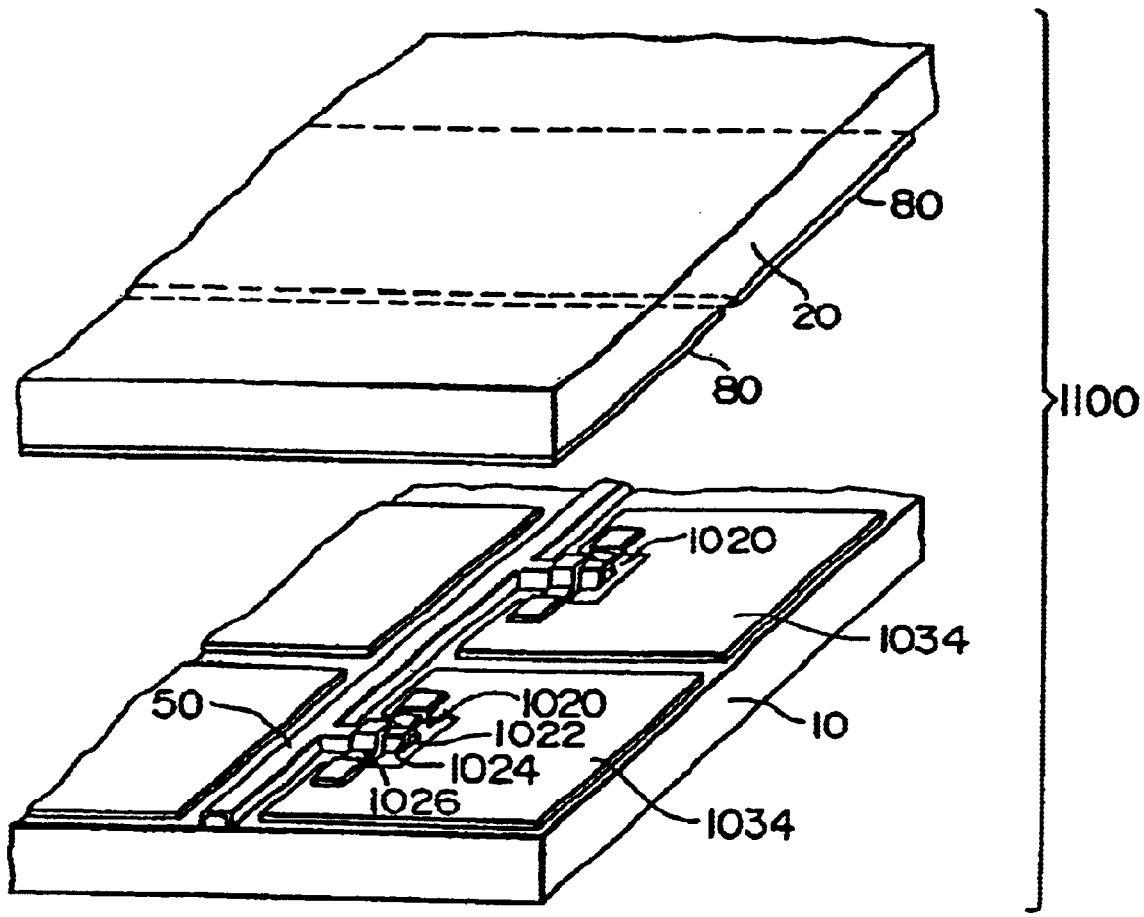
FIG. 15 is a partly fragmentary perspective view of a liquid crystal display panel according to a modified embodiment.
Figure 16:
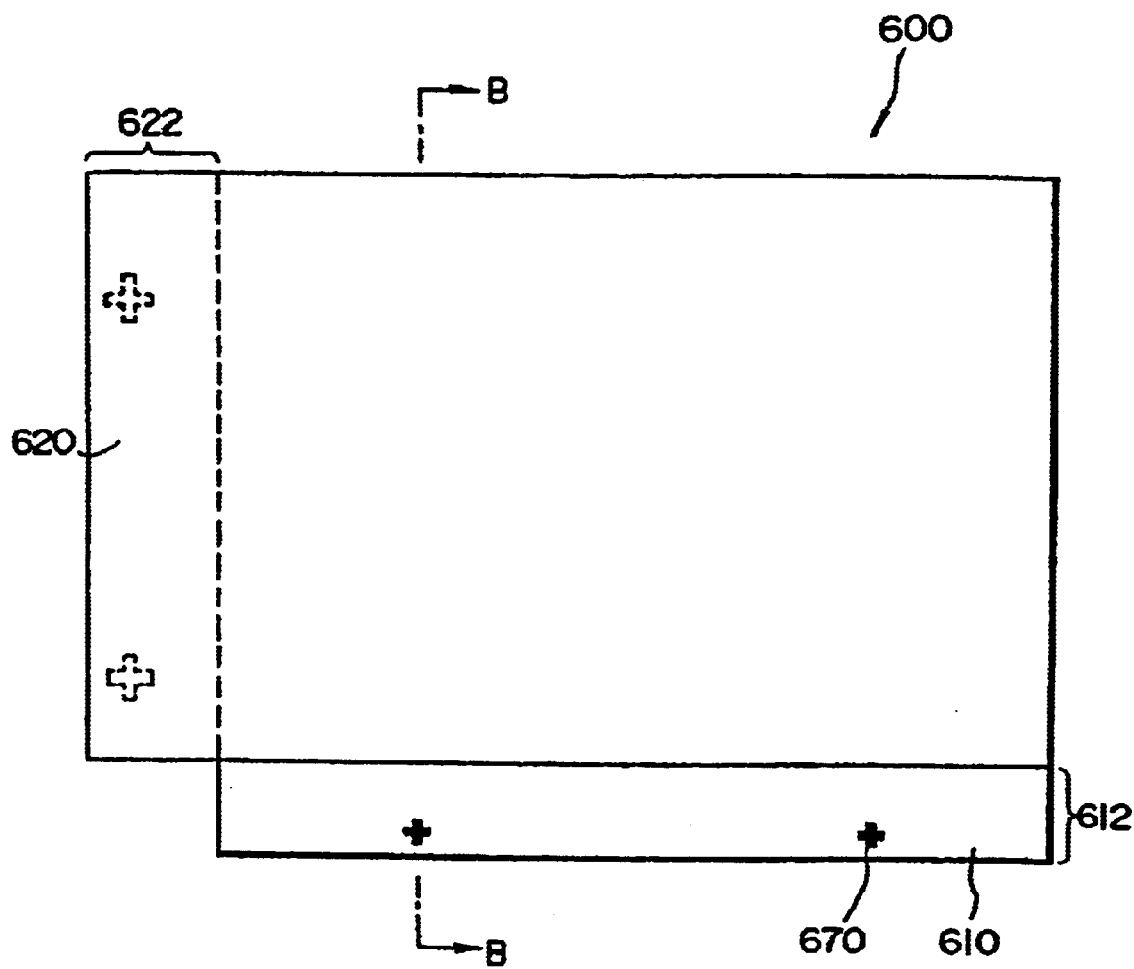
FIG. 16 is a schematic plan view showing a liquid crystal display panel of a conventional example.
Figure 17:
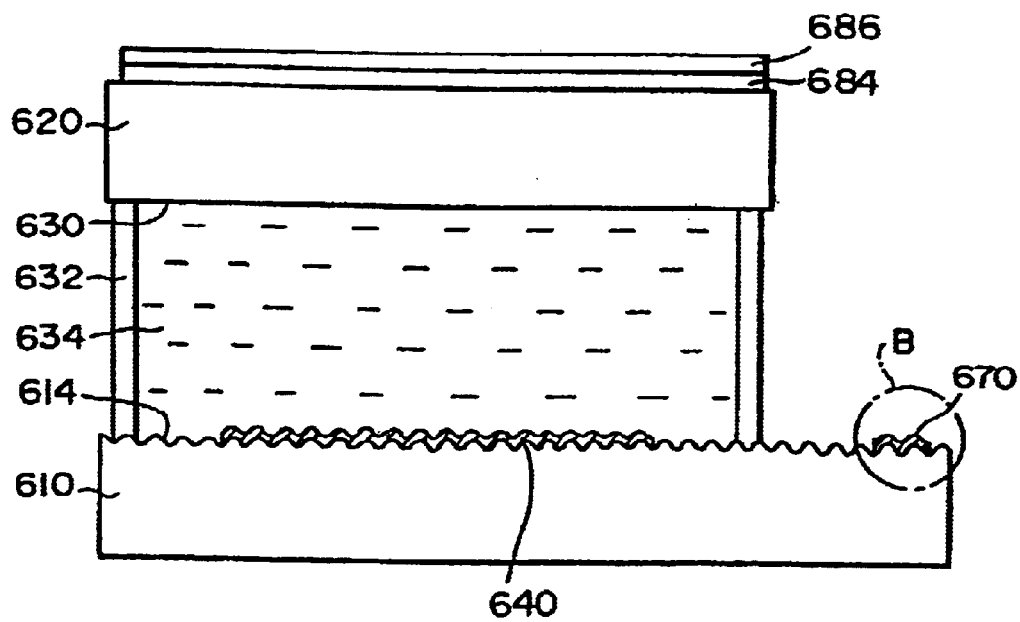
FIG. 17 is a schematic cross-sectional view taken along the line B—B in FIG. 16.
Figure 18:
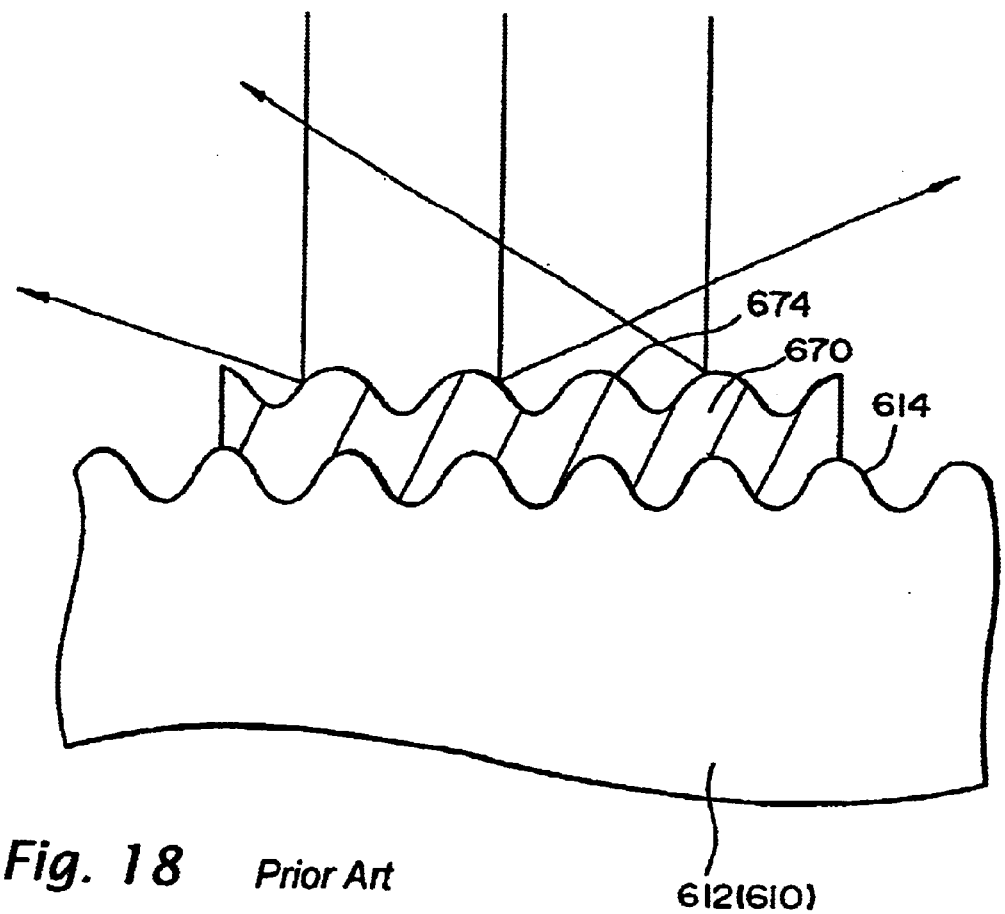
FIG. 18 is a schematic enlarged view of B in FIG. 17.

In FIG. 15, a liquid crystal display panel according to the modified embodiment is shown. In FIG. 15, the same reference numerals designate the same parts having substantially the same functions as those in FIG. 1, and detailed descriptions thereof are omitted.

Since a planar structure of a liquid crystal display panel 1100 is equivalent to that of the liquid crystal display panel shown in FIG. 1, the structure inside the sealing member is shown in FIG. 15.

A liquid crystal display panel 500 has a first substrate 10 and a second substrate 20 disposed so that they oppose each other. Between the first substrate 10 and the second substrate 20, the sealing member (not shown) is disposed so that it surrounds a display area. In addition, in the space formed by the first substrate 10, the second substrate 20, and the sealing member, liquid crystal, which is not shown, is enclosed.

In addition, the surface of the first substrate 10 opposing the second substrate 20 (the liquid crystal layer) is formed to have as irregular surface, although this is not shown. In addition, as is the case with the first embodiment, on the first substrate 10, a reflective layer, a coloring layer, and a protective layer, which are not shown, are formed sequentially on the first substrate 10. Subsequently, on the top layer as thus formed—, a plurality of pixel electrodes 1034 in the form of a matrix and signal electrodes 50 extending in the X direction are disposed, and the individual pixel electrodes 1034 disposed in one line are respectively connected in common with one signal electrode 50 via associated TFD elements. The pixel electrode is composed of a material transparent to incident light and reflected light (light for display), such as indium tin oxide (ITO). The TFD element 1020 is composed of, when observed from the first substrate 10 side, a first metal film 1022, an anodized oxide film 1024 formed by anodizing the first metal film 1022, and a second metal film 1026 and has the sandwich structure of a metal, an insulating material, and a metal. Accordingly, the TFD element 1020 has a bidirectional diode-switching characteristic.

In addition, on the surface of the second substrate 20 opposing the first substrate 10, a plurality of scanning electrodes 80 are disposed. Each scanning electrode 80 is disposed in parallel with the other at a predetermined interval in the direction perpendicular to the signal electrode 50 (Y direction in FIG. 15) and is disposed so as to be a counter electrode to the pixel electrode 1034. Although the coloring layer is not shown in FIG. 15, the coloring layer is provided at locations corresponding to the areas at which the scanning electrodes 80 and the pixel electrodes 1034 intersect each other.

Furthermore, the following embodiment, which is not shown in the figures, may be used. That is, on a substrate having an irregular surface, a reflective layer, a coloring layer, a protective layer, and striped-shape electrodes (for example, ITO) are sequentially formed on the substrate. Subsequently, on a substrate (a substrate on which light from the outside falls) opposing the substrate mentioned above, pixel electrodes and TFD elements may be formed.

In the embodiments described above, as a mark formed on the planarized layer, the alignment mark is described. However, the mark formed on the planarized layer is not limited to an alignment mark, and a mark for process control may be formed. As a mark for process control, a digitized mark, a bar-code mark, and a patterned two-dimensional bar-code (delivery code) mark may be mentioned.

In the embodiments described above, the alignment mark is used for alignment between the flexible circuit substrate or the driver IC and the liquid crystal display panel. However, the alignment mark may be applied to panel assembly, and panel cutting.

In the embodiments described above, the alignment mark is directly formed on the planarized layer. However, a cohesion-improving layer may be provided between the alignment mark and the planarized layer.

What is claimed is:

1. An electro-optic panel comprising:
    a first substrate and a second substrate opposing each other,
    said first substrate having a protruding portion formed so that an edge portion of said first substrate protrudes beyond an edge portion of said second substrate,
    said first substrate including an irregular surface opposing said second substrate and extending over said protruding portion;
    a planarized layer provided on the irregular surface in said protruding portion, said planarized layer being space apart from said edge portion of said second substrate and having an island-like shape; and
    a mark provided on said planarized layer.

2. An electro-optic panel according to claim 1, wherein said mark further comprises at least one of an alignment mark and a mark for process control.

3. An electro-optic panel according to claim 1, wherein said electro-optic panel further comprises a liquid crystal panel.

4. An electro-optic panel according to claim 3, wherein said liquid crystal panel further comprises a reflective liquid crystal panel.

5. An electro-optic panel according to claim 3, wherein said liquid crystal panel further comprises a transflective liquid crystal panel.

6. An electro-optic panel according to claim 1, wherein a material used for said planarized layer comprises a material having optical characteristics similar to that of said first substrate.

7. An electro-optic panel according to claim 6, wherein the material used for said planarized layer further comprises at least one of an acrylic resin, a polyimide resin, a polyamide resin, a polyacrylic amide resin, and a polyethylene terephthalate resin.

8. An electro-optic panel according to claim 1, wherein a material used for said mark is a material primarily composed of indium tin oxide, aluminum, silver, chromium, tantalum, or nickel.

9. An electro-optic panel according to claim 1, further comprising an electrode layer formed on said first substrate, wherein said electrode layer and said mark are composed of the same material.

10. An electro-optic panel according to claim 9, wherein a material used for said electrode layer and for said mark is a material primarily composed of indium tin oxide, tantalum, aluminum, silver, chromium, or nickel.

11. An electro-optic panel according to claim 1, further comprising a reflective layer formed on said first substrate, wherein said reflective layer and said mark are composed of the same material.

12. An electro-optic panel according to claim 11, wherein a material used for said reflective layer and for said mark is a material primarily composed of aluminum, silver, chromium, or nickel.

13. An electro-optic panel according to claim 1,
    further comprising a coloring layer on the first substrate and a protective layer for protecting said coloring layer,
    wherein said planarized layer and said protective layer are composed of the same material.

14. A method for manufacturing an electro-optic panel including a first substrate and a second substrate opposing each other,
    said first substrate having a protruding portion formed so that an edge portion of said first substrate protrudes beyond an edge portion of said second substrate,
    said first substrate including an irregular surface opposing said second substrate and extending over said protruding portion, the method comprising:

(a) a step of forming a planarized layer on said irregular surface in said protruding portion, said second planarized layer being spaced apart from said edge portion of said second substrate and having an island-like shape; and (b) a step of forming a mark on said planarized layer.

15. A method for manufacturing an electro-optic panel according to claim 14, wherein said mark further comprises at least on of an alignment mark and a mark for process control.

16. A method for manufacturing an electro-optic panel, according to claim 14, wherein said electro-optic panel further comprises a liquid crystal panel.

17. A method for manufacturing an electro-optic panel according to claim 16, wherein said liquid crystal panel further comprises a reflective liquid crystal panel.

18. A method for manufacturing an electro-optic panel according to claim 16, wherein said liquid crystal panel further comprises a transflective liquid crystal panel.

19. A method for manufacturing an electro-optic panel according to claim 14, wherein a material used for said planarized layer comprises a material having optical characteristics similar to that of said first substrate.

20. A method for manufacturing an electro-optic panel according to claim 19, wherein the material used for said planarized layer further comprises at least one of an acrylic resin, a polyimide resin, a polyamide resin, a polyacrylic amide resin, and a polyethylene terephthalate resin.

21. A method for manufacturing an electro-optic panel according to claim 14, wherein a material used for said mark is a material primarily composed of indium tin oxide, aluminum, silver, chromium, tantalum, or nickel.

22. A method for manufacturing an electro-optic panel according to claim 14, further comprising a step of forming an electrode layer on the first substrate, wherein said mark and said electrode layer are formed in the same step.

23. A method for manufacturing an electro-optic panel according to claim 22, wherein a material used for the mark and for said electrode layer is a material primarily composed of indium tin oxide, tantalum, aluminum, silver, chromium, or nickel.

24. A method for manufacturing an electro-optic panel according to claim 14, further comprising a step of forming a reflective layer on said first substrate, wherein said mark and said reflective layer are formed in the same step.

25. A method for manufacturing an electro-optic panel according to claim 24, wherein a material used for said mark and for said reflective layer is a material primarily composed of aluminum, silver, chromium, or nickel.

26. A method for manufacturing an electro-optic panel according to claim 14, further comprising a step of forming a coloring layer on the first substrate and a step of forming a protective layer for protecting said coloring layer, wherein said planarized layer and said protective layer are formed in the same step.

27. An electro-optic device comprising an electro-optic panel according to claim 1.

28. An electronic apparatus comprising an electro-optic device according to claim 27.

29. An electro-optic panel comprising:
a first substrate and a second substrate opposing each other;
said first substrate having a protruding portion protruding beyond an edge of said second substrate;
said first substrate including an irregular surface opposing said second substrate and extending over said protruding portion;
a first planarized layer provided on the irregular surface opposing said second substrate;
a second planarized layer provided on the irregular surface in said protruding portion, said second planarized layer being spaced apart from said first planarized layer; and
a mark provided on said second planarized layer.

30. A method for manufacturing an electro-optic panel including a first substrate and a second substrate opposing each other wherein said first substrate has a protruding portion protruding beyond an edge of said second substrate, and said first substrate includes and irregular surface opposing said second substrate and extending over said protruding portion, the method comprising:
(a) a step of forming a first planarized layer on said irregular surface opposing said second substrate;
(b) a step of forming a second planarized layer on said irregular surface in said protruding portion, said second planarized layer being spaced apart from said first planarized layer; and
(c) a step of forming a mar on said second planarized layer.

31. A method for manufacturing an electro-optic panel according to claim 30, further comprising a step of forming a coloring layer on the first substrate and a step of forming a protective layer for protecting said coloring layer, wherein said second planarized layer and said protective layer are formed in the same step.

32. An electro-optic panel comprising:
a first substrate and a second substrate opposing each other;
said first substrate having a protruding portion protruding beyond an edge of said second substrate;
said first substrate having an irregular surface opposing said second substrate and extending over said protruding portion;
a first planarized layer provided on the irregular surface opposing said second substrate;
a second planarized layer provided on the irregular surface in said protruding portion, said second planarized layer being spaced apart from said first planarized layer and having an island-like shape; and
a mark provided on said second planarized layer.

33. An electro-optic panel according to claim 32, further comprising:
a coloring layer on the first substrate and a protective layer protecting said coloring layer,
wherein said second planarized layer and said protective layer are composed of the same material.

34. A method for manufacturing an electro-optic panel including a first substrate and a second substrate opposing each other, wherein said first substrate has a protruding portion protruding beyond an edge of said second substrate, said first substrate having an irregular surface opposing said second substrate and extending over said protruding portion, the method comprising:
(a) a step of forming a first planarized layer on said irregular surface opposing said second substrate;
(b) a step of forming a second planarized layer on said irregular surface in said protruding portion, said second planarized layer being spaced apart from said first planarized layer and having an island-like shape; and
(c) a step of forming a mark on said second planarized layer.

35. An electro-optic panel comprising:

a first substrate and a second substrate opposing each other, said first substrate having a protruding portion formed so that an edge portion of said first substrate protrudes beyond an edge portion of said second substrate, said first substrate including an irregular surface opposing said second substrate and extending over said protruding portion;

a planarized layer provided on the irregular surface in said protruding portion, said planarized layer being spaced apart from a peripheral edge of said protruding portion and said edge portion of said second substrate; and a mark provided on said planarized layer.

36. A method for manufacturing an electro-optic panel including a first substrate and a second substrate opposing each other, said first substrate having a protruding portion formed so that an edge portion of said first substrate protrudes beyond an edge portion of said second substrate, said first substrate including an irregular surface opposing said second substrate and extending over said protruding portion, the method comprising:

(a) a step of forming a planarized layer on said irregular surface in said protruding portion, said planarized layer being spaced apart from a peripheral edge of said protruding portion and said edge portion of said second substrate; and (b) a step of forming a mark on said planarized layer.

37. An electro-optic panel comprising:

a first substrate and a second substrate opposing each other, said first substrate having a protruding portion formed so that an edge portion of said first substrate protrudes beyond an edge portion of said second substrate, said first substrate including an irregular surface opposing said second substrate and extending over said protruding portion;

a planarized layer provided on the irregular surface in said protruding portion, said planarized layer being inscribed within and spaced apart from a peripheral edge of said protruding portion and said edge portion of said second substrate; and a mark provided on said planarized layer.

38. A method for manufacturing an electro-optic panel including a first substrate and a second substrate opposing each other, said first substrate having a protruding portion formed so that an edge portion of said first substrate protrudes beyond an edge portion of said second substrate, said first substrate including an irregular surface opposing said second substrate and extending over said protruding portion, the method comprising:

(a) a step of forming a planarized layer on said irregular surface in said protruding portion, said planarized layer being inscribed within and spaced apart from a peripheral boundary of said protruding portion and said edge portion of said second substrate; and (b) a step of forming a mark on said planarized layer.

* * * * *